United States Patent
Murakowski

(10) Patent No.: US 10,571,559 B2
(45) Date of Patent: Feb. 25, 2020

(54) REAL-TIME MILLIMETER WAVE HOLOGRAPHIC SCANNER

(71) Applicant: Phase Sensitive Innovations, Inc., Newark, DE (US)

(72) Inventor: Janusz Murakowski, Bear, DE (US)

(73) Assignee: Phase Sensitive Innovations, Inc., Newark, DE (US)

(*) Notice: Subject to any disclaimer, the term of this patent is extended or adjusted under 35 U.S.C. 154(b) by 290 days.

(21) Appl. No.: 15/591,771

(22) Filed: May 10, 2017

(65) Prior Publication Data

US 2017/0328998 A1 Nov. 16, 2017

Related U.S. Application Data

(60) Provisional application No. 62/333,894, filed on May 10, 2016.

(51) Int. Cl.
| | | |
|---|---|---|
| *G01S 13/89* | (2006.01) | |
| *G01S 13/42* | (2006.01) | |
| *G01S 13/34* | (2006.01) | |
| *G03H 5/00* | (2006.01) | |

(52) U.S. Cl.
CPC ........... *G01S 13/89* (2013.01); *G01S 13/34* (2013.01); *G01S 13/42* (2013.01); *G03H 5/00* (2013.01); *G03H 2210/30* (2013.01); *G03H 2210/62* (2013.01); *G03H 2222/36* (2013.01); *G03H 2227/03* (2013.01); *G03H 2227/05* (2013.01)

(58) Field of Classification Search
CPC ........ G01S 13/89; G01S 13/003; G01S 13/94; G01S 13/36; G01S 13/34; G01S 13/42; G03H 5/00; G03H 2227/05; G03H 2222/36; G03H 2227/03; G03H 2210/30; G03H 2210/62

USPC .......................................................... 342/129
See application file for complete search history.

(56) References Cited

U.S. PATENT DOCUMENTS

| | | | | |
|---|---|---|---|---|
| 3,812,493 | A * | 5/1974 | Afendykiw | G01S 13/003 342/145 |
| 5,451,957 | A * | 9/1995 | Klausing | G01S 13/9035 342/191 |
| 5,731,778 | A * | 3/1998 | Nakatani | G01S 7/354 342/109 |
| 6,054,947 | A * | 4/2000 | Kosowsky | G01S 13/89 342/191 |
| 6,577,264 | B1 * | 6/2003 | Wolframm | G01S 13/9035 342/25 R |
| 8,319,678 | B2 * | 11/2012 | Weiss | G01S 13/003 342/175 |
| 2002/0135505 | A1 * | 9/2002 | Klausing | G01S 13/42 342/25 R |
| 2005/0286101 | A1 * | 12/2005 | Gamer | G03H 1/02 359/9 |
| 2013/0265185 | A1 * | 10/2013 | Kreitmair-Steck | G01S 13/9303 342/29 |
| 2014/0292556 | A1 * | 10/2014 | Kreitmair-Steck | G01S 13/9303 342/29 |

* cited by examiner

*Primary Examiner* — Frank J McGue
(74) *Attorney, Agent, or Firm* — Muir Patent Law, PLLC

(57) ABSTRACT

A vehicle such as a helicopter may scan a scene using a transmitter mounted on a rotating part like a rotor and a receiver mounted on a body of the vehicle. Based on a Doppler shift caused by the rotation of the rotating part, patterns may be recorded and used to develop a holographic image of the scene.

25 Claims, 23 Drawing Sheets

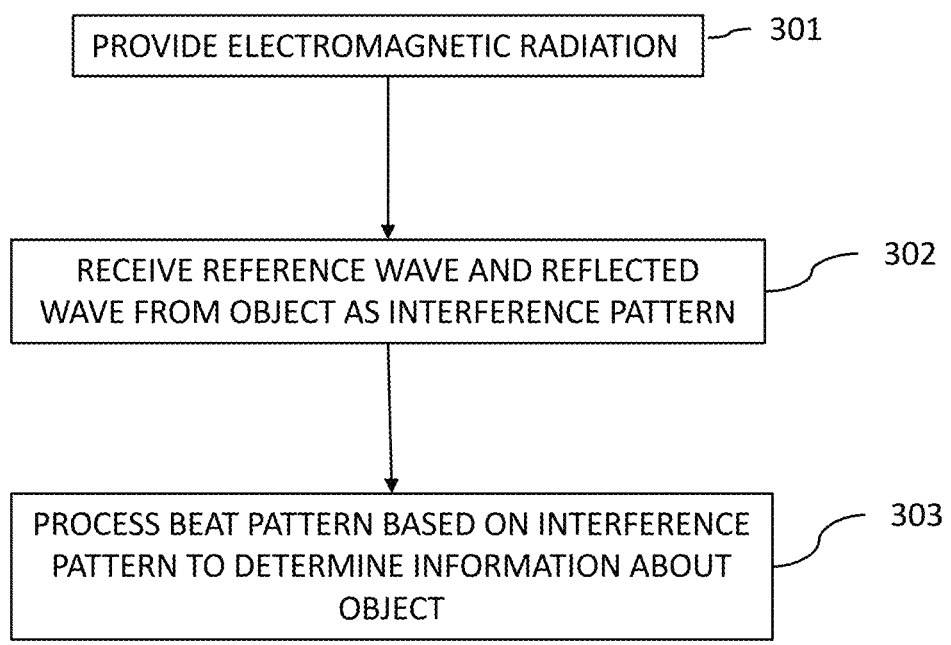

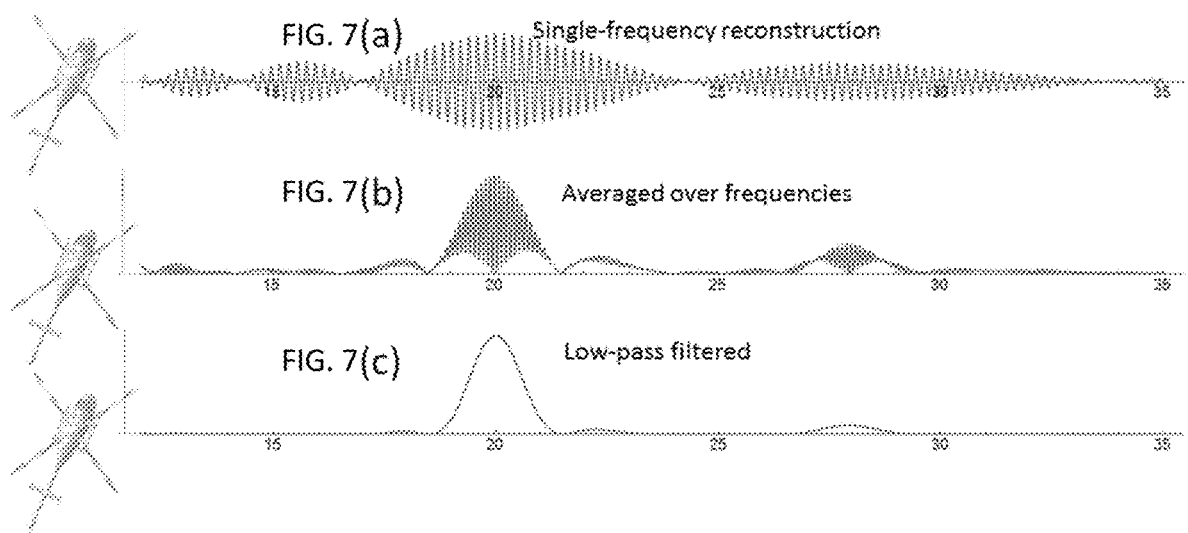

REAL-TIME MILLIMETER WAVE HOLOGRAPHIC SCANNER

CROSS-REFERENCE TO RELATED APPLICATION

This application claims priority to U.S. Provisional Application No. 62/333,894, filed May 10, 2016, the entire contents of which are incorporated by reference herein.

This invention was made with government support under Contract No. W911W6-15-C-0019 awarded by U.S. Army Research, Development and Engineering Command. The government has certain rights in the invention.

BACKGROUND

This application discloses a system for obtaining 3D information of a region in space potentially occupied by multiple objects. More specifically, the system is suitable for sensing and reconstruction of objects surrounding a helicopter or other device including a rotating rotor in all-weather conditions in real time. In addition, the system senses the state of the helicopter main rotor.

SUMMARY

Degraded visual environment (DVE) presents a challenge for helicopter pilotage, particularly in close proximity to potential hazards such as vegetation, poles, wires, buildings, vehicles, personnel, equipment, nearby terrain, other aircraft, or ship superstructures. To safely negotiate these hazards, the aircrew must maintain a continuous awareness of the environment that can include both static and moving obstacles. In the absence of direct visual cues in DVE, the crew must rely on other means to determine the location and movement of these hazards. To be useful in a variety of operational scenarios, the system should provide full 3D real-time information about the dynamically changing environment independent of the time of day or night, the presence of smoke, dust, clouds, rain, or snow. Ideally, a sensor placed on the aircraft would provide sufficient information to form a 3D digital model of the surrounding area.

In this context, millimeter waves (mmW-s) are uniquely suited as a probe capable of penetrating through airborne obscurants and darkness alike. The wavelength is long enough to be unaffected by smoke or dust particles, but short enough to provide a detailed image of the environment. In addition, utilizing the entirety of the aircraft as the aperture of the imaging system provides means for high-resolution three-dimensional reconstruction of the scene including both stationary and moving objects. Such capability will allow new flexibility in safely operating an aircraft in situations presently posing considerable risks.

MmW-s can be used for real-time imaging through obscurants associated with the operation of a helicopter. For example, one passive system relies on thermal radiation of mmW-s from the scene and the reflection of cold sky to produce contrast. This system does not use active mmW illumination. Images and real-time video obtained with a passive system, including mmW videos shot from a flying helicopter, show on the one hand that mmW-s are suitable for seeing through common obscurants, and on the other hand that one approach to image reconstruction is sound.

In certain embodiments, mmW imaging is applied to active mmW illumination. The use of active mmW imaging may provide information about the helicopter surroundings in full 3D. The approach uses the movement of the main rotor for the scanning, and a distributed mmW receiver concept for detection and processing. The captured signal may contain information that may be used to determine the position and movement of objects in the vicinity of the helicopter as well as the state of the rotor.

Whereas the description focuses on millimeter waves (mmW) that span the wavelength range between 0.1 mm and 10 mm, the invention may be applicable to shorter and longer wavelengths as well. In addition, modalities other than electromagnetic waves, e.g. acoustic waves, may be employed as well without departing from the spirit of the invention. Similarly, the description focuses on the application to rotorcrafts, and in particular to helicopters. However, the invention may be applicable in other cases not explicitly discussed below and other embodiments may be implemented that use (1) multiple locations of the transmitter, (2) multiple locations of the receiver, (3) multiple wavelengths, and (4) processing, to reconstruct the location and/or movement of objects in space. Some of these other embodiments may also use rotating mechanisms, such as rotors, windmills, propellers, etc.

BRIEF DESCRIPTION OF THE DRAWINGS

FIG. 3 is a flowchart depicting a method according to various embodiments.

FIG. 7a depicts single-frequency reconstructions along the range direction, according to one example.

FIG. 7b depicts averaging over several frequencies yielding oscillatory reconstruction mostly concentrated around the position of an object.

FIG. 7c shows an oscillatory trace smoothed-out by applying a low pass filter to the result of FIG. 7b.

DETAILED DESCRIPTION

Figure 1:
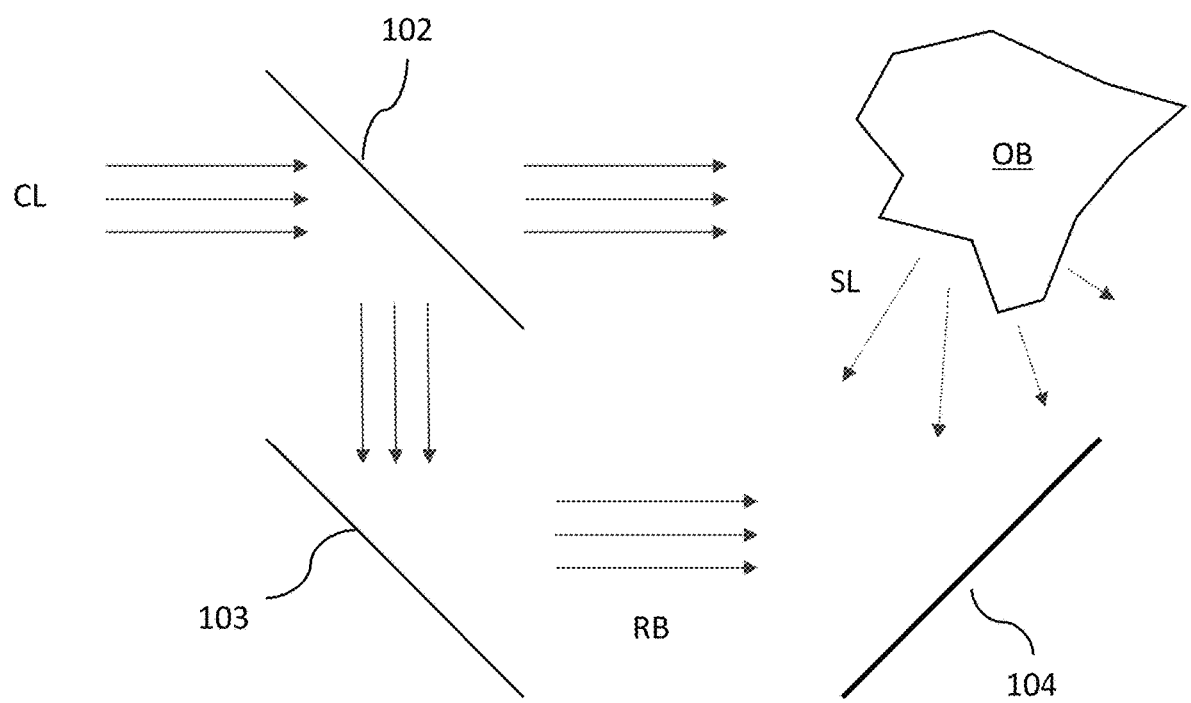
FIG. 1 depicts a method of recording a hologram.

The present disclosure now will be described more fully hereinafter with reference to the accompanying drawings, in which various embodiments are shown. The invention may, however, be embodied in many different forms and should not be construed as limited to the example embodiments set forth herein.

In the drawings, the size and relative sizes of layers and regions may be exaggerated for clarity. Like numbers refer to like elements throughout. Though the different figures show variations of exemplary embodiments, and may be referred to using language such as "in one embodiment," these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration.

It will be understood that, although the terms first, second, third etc. may be used herein to describe various elements, components, regions, layers and/or sections, these elements, components, regions, layers and/or sections should not be limited by these terms. Unless the context indicates otherwise, these terms are only used to distinguish one element, component, region, layer or section from another element, component, region, layer or section, for example as a naming convention. Thus, a first element, component, region, layer or section discussed below in one section of the specification could be termed a second element, component, region, layer or section in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

Terms such as "same," "equal," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to emphasize this meaning, unless the context or other statements indicate otherwise. For example, items described as "substantially the same," "substantially equal," or "substantially planar," may be exactly the same, equal, or planar, or may be the same, equal, or planar within acceptable variations that may occur, for example, due to manufacturing processes.

Terms such as "about" or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

As is traditional in the field of the disclosed technology, certain features and embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 depicts a method of recording a hologram. For example, to record a hologram according to this example, scattered light SL scattered from an object OB combines with a reference beam RB to form an interference pattern that is recorded on a photosensitive plate 104. A coherent illumination (e.g., coherent light CL) may be illuminated toward a beam splitter 102. Part of the coherent light passes through the beam splitter and reaches the object OB, where it is scattered to produce scattered light SL, also described as reflected light. Part of the coherent light is reflected off the beam splitter and reaches a mirror 103, where it is reflected to form a reference beam RB, also described as a reference light or reference signal. Both the reference beam RB and the scattered light SL reach the photosensitive plate 104, where an interference pattern IP is recorded.

Illuminating the thus-produced interference pattern IP with coherent light CL reproduces the phase-front of light scattered from the original object, i.e., coherent light CL scattered by the hologram generates the same appearance or image as that scattered by the original object itself. Thus, for a hologram formed in this manner, the recorded interference pattern may contain all information necessary to reconstruct the placement of a three-dimensional object in space. Not only that, in some cases, the entire hologram is not needed to reconstruct the image of the 3D object, so removing portions of the photosensitive plate can be tolerated. Thus 'sampling' the hologram in several different places may be sufficient for such reconstruction.

According to certain embodiments, an approach to 3D real-time imaging uses active illumination to detect a helicopter's surroundings in full 3D. For example, the helicopter itself may be used to produce a coherent radiation and/or to record the hologram, also referred to as a holographic image. For example, the presence of an active millimeter wavelength (mmW) source mounted on the helicopter rotor offers opportunities absent from the passive-only system.

Figure 2A:
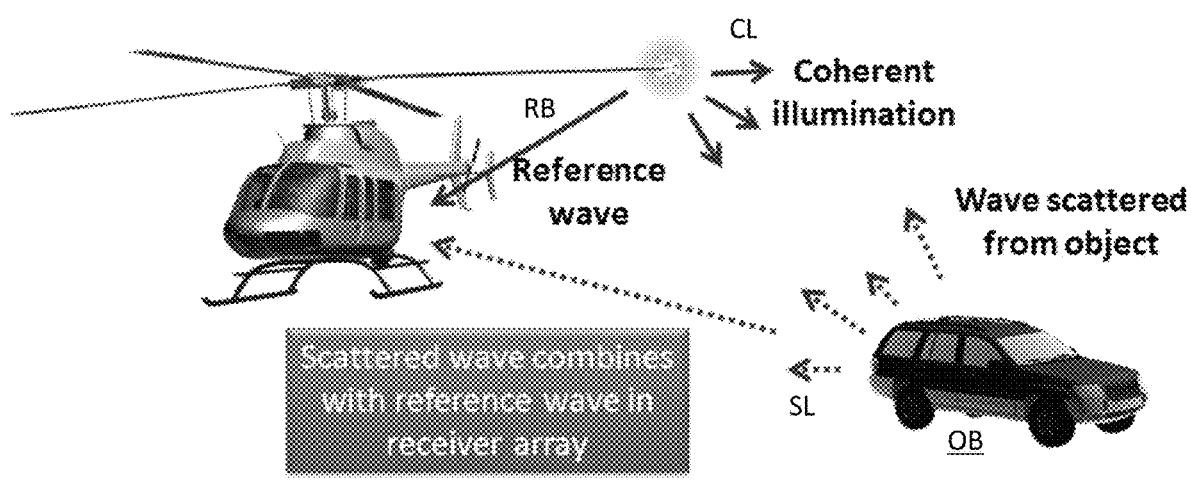
FIGS. 2A and 2B show examples of a holographic scanning system according to some embodiments.
Figure 2B:
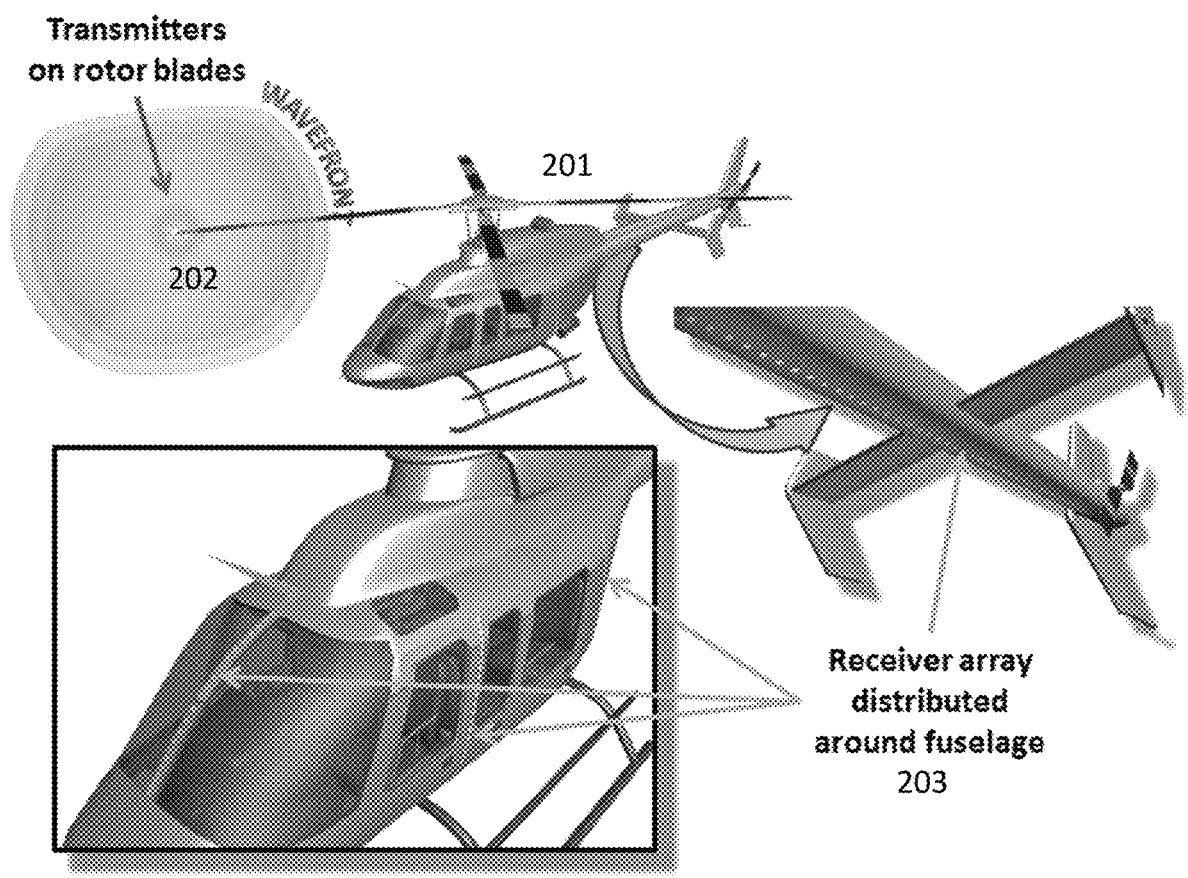

FIGS. 2A and 2B illustrate a holographic implementation using a helicopter, according to one example embodiment. In particular, millimeter wavelength radiation (e.g., electromagnetic radiation having wavelengths between 0.1 and 10 mm) may be used. This may be referred to as real-time millimeter-wave holography, and may be used for helicopter pilotage in certain situations. In this example, coherent radiation (e.g., electromagnetic radiation), is provided by a coherent radiation generator 202 placed (e.g., mounted) on a rotor blade 201 of a helicopter. The coherent radiation generator 202 may be described as a coherent radiation source, or an electromagnetic wave-radiating transmitter, and may radiate, generate, provide, and transmit a coherent radiation (e.g., an electromagnetic wave). In certain embodiments, the coherent radiation generator 202 generates a mmW radiation having a single frequency. Electromagnetic waves scattered from objects in the scene combine with the reference wave RB, also generated by the coherent radiation generator 202 (e.g., the same electromagnetic wave radiation can be generated and transmitted to serve as both the coherent radiation CL and as the reference radiation RB).

In this manner, the RF signal coming directly from the transmitter (e.g., coherent radiation generator 202) is combined with the signal scattered by the objects in the scene to form an interference pattern of millimeter waves, which is sampled by the receivers 203 (e.g., antenna elements) distributed on an outside of the helicopter, such as around the helicopter fuselage. Thus, the helicopter-based hologram creation apparatus produces an mmW hologram using coherent radiation produced by the helicopter, electromagnetic waves scattered from objects in the scene, and recording/receiving equipment on the helicopter that processes a combination of a reference wave produced by the coherent radiation and scattered waves also resulting from the coherent radiation.

For example, in one embodiment, the scattered waves and the reference wave are received by the receiver array 203 formed of receiving devices mounted on the outside of the helicopter (e.g., on the fuselage). The receiver array 203 samples the resulting mmW hologram of the scene. The system of FIGS. 2A and 2B may provide a sampled or a continuous record of the interference pattern. Such a mmW hologram may contain all information used for the reconstruction of the 3D scene around the aircraft.

In general, in optical holography, as described in reference to FIG. 1 above, a 3D object is reconstructed by illuminating the recorded hologram with coherent light at the same wavelength that was used in its capture. Such approach may not be desirable in mmW holography as the resulting reconstruction would be the same size as the original. Thus, in some examples, the 3D mmW scene may be reconstructed via a computer simulation using algorithms.

In more detail, for continuous around-the-craft sensing, receiver-antenna elements may be placed in various locations around the helicopter fuselage, as shown in FIG. 2B. The collected signals may be amplified and mixed with a local oscillator tuned to a frequency in the vicinity of the transmitted mmW. The result may be filtered to separate a low frequency component (baseband up to a few tens or hundreds of Hz) from the high-frequency component (above several hundred Hz, up to a couple hundred kHz), digitized, and transmitted to a central location for processing. The high-frequency component may contain information about the scene surrounding the helicopter, whereas the low-frequency component contains information about the rotor state. Notably, in some embodiments, in the continuous-wave (CW) operation of the transmitter at first high frequency (e.g., 77 GHz), all information about the scene and about the rotor state is contained in a second, lower frequency (e.g., 160 kHz) band induced by the Doppler shift due to the movement of the rotor-mounted transmitter, the movement of objects in the scene, and the movement of the platform (e.g., helicopter) itself—assuming subsonic velocities. Hence, digitizing the down-mixed signals may use readily available, low-cost, low-frequency electronic components, such as a 200-kHz analog-to-digital (ADC) converter. Further details about this processing as well as forming a three-dimensional image are described below.

FIG. 3 is a flowchart depicting a method according to various embodiments. For example, the method may include a method of determining information about an object, such as a method of reconstructing a three-dimensional image including the object. The method may be performed by a vehicle, such as a helicopter, provided with an electromagnetic wave transmitter, one or more electromagnetic wave receivers, and an on-board computer communicatively connected to the one or more electromagnetic wave receivers and configured to process the signals received by the electromagnetic wave radiation receivers, which signals may be interference patterns.

In step 301, illumination is provided (illumination referring to the generation and transmission of an electromagnetic wave). For example, the illumination may be an electromagnetic wave radiated and transmitted from an electromagnetic wave transmitter, such as 202 described above and in more detail below. An example of an electromagnetic wave transmitter will be described in greater detail later. The transmitted electromagnetic radiation may in some embodiments be electromagnetic waves having a range of frequencies. The transmitted electromagnetic radiation may be in the millimeter wave (mmW) frequency. For example in some embodiments, the electromagnetic wave transmitter may be configured to generate a single frequency of electromagnetic wave radiation, for example, having a single frequency in the millimeter wave spectrum.

In step 302, a reference wave and a reflected wave are received as an interference pattern. For example, the reference wave and reflected wave may form an interference pattern and may be received by an electromagnetic wave receiver, such as 203 described above and in more detail below. The reference wave may be a wave radiating directly from the electromagnetic wave transmitter. In one embodiment, a receiver may be located at an axis of rotation of the rotor of a helicopter. The reflected wave may be a wave radiating from the electromagnetic wave transmitter and reflected off of objects outside of the vehicle. Because the helicopter rotor blade is rotating at a high speed, the reflected wave may undergo a Doppler effect, or Doppler shift, that differs from the Doppler shift affecting the reference wave, so that a beat signal is created by combining the reflected wave with the reference wave. The beat signal may reflect a sample of an interference pattern between the reflected wave and the direct wave received by the receiver(s) from the transmitter(s) as the helicopter rotor rotates. For example, the beat signal may be formed by sampling the combined reflected wave and reference wave as a helicopter rotor rotates and recording the combined signal at the sampled time intervals during the rotation. The beat signal may exist without the sampling, but in order to reduce processing, as the rotor rotates, the beat signal may be sampled, for example, at the receiver. In some embodiments, the beat signal may be one of a plurality of beat signals, for example, due to a plurality of frequencies (e.g., a range of frequencies) transmitted by a plurality of respective electromagnetic wave transmitters (e.g., each transmitter generating a constant frequency for a plurality of rotations of the rotor, which frequency as transmitted includes a Doppler shift during each rotation). The frequencies may all be in the mmW range, to allow for better viewing of objects or scenes through materials such as clouds, fog, smoke, dust, etc. In addition, the interference pattern or interference patterns that result in a beat signal or beat signals may be received by a plurality of electromagnetic wave receivers, placed at different locations of the vehicle, such as on different locations of a fuselage of a helicopter.

In step 303, the one or more interference patterns (also described as interference signals) are processed to determine information about the object or scene. For example, in some embodiments, one or more electromagnetic wave receivers that receive respective interference patterns and sample them to form respective beat signals (also referred to as a beat patterns) are in communication with a computer system, such as an on-board vehicle computer, which is programmed and configured to process the beat patterns. For example, different waveforms for the beat patterns or signals may include information about points in three-dimensional space, such as a location and other visual characteristics of objects in the space. Using a plurality of waveforms for the different beat patterns produced over time and by the one or more electromagnetic wave receivers, information about objects, such as their shape or visual appearance, may be detected. As a result, a three-dimensional image of an object or scene can be reconstructed. Additional details and examples about the processing steps and algorithms are described further below.

As described herein, a 3D scene surrounding the helicopter can be reconstructed digitally from signals received by antennas scattered around the fuselage of a helicopter. As described further below, the received signals vary based on variations in the placement of the objects in the scene and/or the placement of the antennas on the fuselage. To this end, various numerical modeling tools allow the evaluation of the system response to multiple objects in the scene and an arbitrary placement of the receiver antenna(s) on the fuselage. During evaluation of this modeling, the operational wavelength was scaled so as to reduce computational burden and provide rapid results. Using this extended capability, the resolution of the system was analyzed both in the lateral (azimuth) direction, range (e.g. horizontal distance), and elevation (e.g., vertical height) to verify the original expectations based on fundamental principles. Furthermore, in the course of the evaluation, certain properties of signals gathered by receivers located away from the axis of the main rotor were discovered, which enable the determination of the rotor state in real time.

Figure 4A:
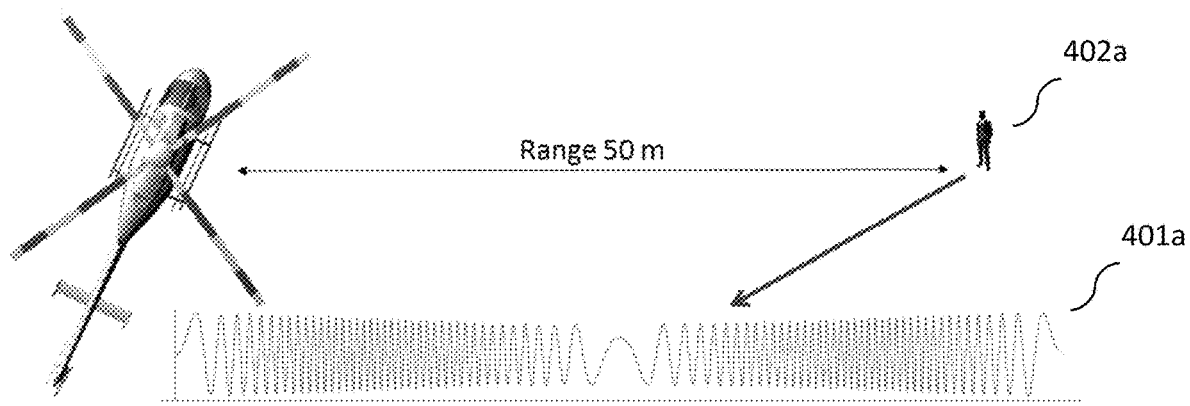
FIG. 4A is a diagram showing an example of a beat signal pattern according to certain embodiments.

FIG. 4A is a diagram showing an example of a beat signal pattern according to certain embodiments. In FIG. 4A, as discussed above, a beat signal 401a resulting from a first electromagnetic wave received directly from a transmitter and a second electromagnetic wave received from a transmitter after being reflected by an object is received by a receiver. The beat signal shown in FIG. 4A corresponds in this example to a single revolution of the main rotor, on which the transmitter is mounted, and corresponds to one of a plurality of interference patterns sampled throughout the single revolution period. The first electromagnetic wave may have a substantially constant frequency, corresponding to the reference wave (see FIG. 2A), while the second electromagnetic wave, corresponding to the wave reflected from the object 402a in the scene may have a varied frequency due to a Doppler effect caused by the transmitter being placed on the rotating blade. The beat signal obtained by sampling a combination of these two electromagnetic waves as the rotor rotates is shown as 401a. In the example of FIG. 4A, the receiver was placed on the axis of rotation of the main rotor of the helicopter. The examples depicted in FIGS. 4A-D show beat signals associated with an object or objects being 50 meters away from the receiver, but this is only one example beat signals and others may occur due to different environments, objects, etc.

Figure 4B:
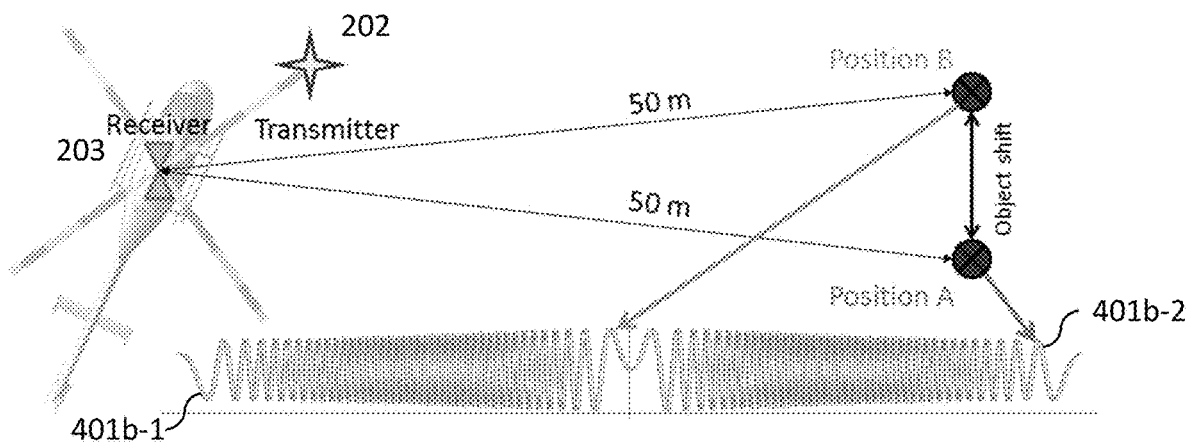
FIG. 4B is a diagram showing an example of an electromagnetic wave receiver placed on a central axis of a rotor of a helicopter, for an object placed at two different positions, according to one embodiment.

FIG. 4B is a diagram showing an example of an electromagnetic wave receiver placed on a central axis of a rotor of a helicopter, for an object placed at two different positions, indicated as Position A and Position B. As can be seen in FIG. 4B, an electromagnetic wave transmitter 202 is placed on a rotating blade of a main rotor of the helicopter, and a receiver 203 is placed at a central axis of rotation of the main rotor. For example, the receiver 203 may be placed on an outer surface of the helicopter on a bottom of the fuselage to be at the axis of rotation of the rotor. As can be seen in FIG. 4B, with the receiver 203 placed at the axis of rotation of the rotor, a first beat signal pattern 401b-1 is received when an object is at a first position (position A), and a second beat signal pattern 401b-2 is received when the object is at a second position (position B). The first and second beat signal patterns are nearly the same, but one is slightly shifted in time, so that they are slightly out of phase. This example represents a situation where the object's distance from the receiver remained constant, but a lateral, or azimuthal position of the object changed (e.g., the object is at the same height with respect to the helicopter and the same distance from the helicopter).

In some embodiments, a receiver, rather than a transmitter, can be placed on a rotating part of a vehicle and the transmitter can be place on a non-rotating part (e.g., stationary part) of the vehicle, or a plurality of transmitters can be placed at stationary, non-rotating locations on the vehicle and can sequentially and alternately transmit signals in a manner that replicates a rotating rotor/Doppler effect.

Figure 4C:
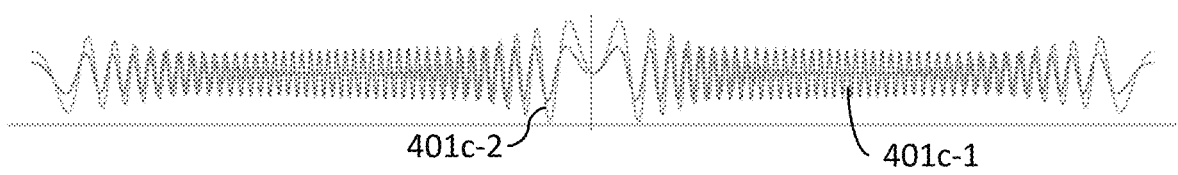
FIG. 4C is a diagram showing an example of a beat signal formed based on two objects in a scene, compared to a beat signal for only one object, according to one embodiment.

FIG. 4C is a diagram showing an example of a beat signal 401c-2 formed based on two objects in a scene, compared to a beat signal 401c-1 for only one object. In this example, two identical point-like objects with unit reflectivity were placed at the same distance from the axis, but at different azimuth (e.g., lateral) positions, separated by a distance substantially the same as in the example of FIG. 4B. As shown, a different waveform from the one corresponding to a single object was formed. As shown, strong amplitude modulation ensues when two objects are present in the scene (signal pattern 401c-2), in comparison to the scene with only a single object (signal pattern 401c-1). In addition, the single object pattern includes a slight shift (delay) compared to the two object pattern. This shift is due to asymmetric placement of the second object, e.g., the second object is added to the scene without moving the first one, hence the slight delay of the entire waveform. The significant change in the received waveform for different numbers, and also different shapes, sizes, etc., of objects, may be used to detect objects and determine their positions and movement by digital processing of the received signals to reconstruct the 3D scene.

In some embodiments, placing the receiver off of the main-rotor axis of rotation may be desirable. For example, such placement allows the flexibility of mounting the receiver on the aircraft. Furthermore, distributing a plurality of receivers provides additional diversity that helps in 3D scene reconstruction, including the vertical direction out of the plane of the main rotor.

Figure 4D:
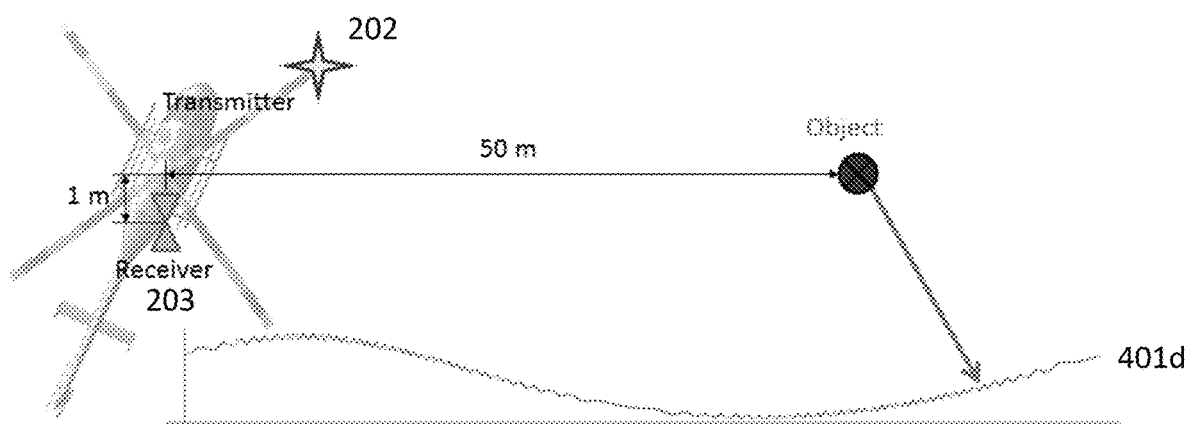
FIG. 4D is a diagram showing an example where a receiver is placed off of the axis of rotation of a main rotor of a helicopter, according to one embodiment.

FIG. 4D is a diagram showing an example where a receiver is placed off of the axis of rotation of a main rotor of a helicopter. FIG. 4D also shows the effect of the off-axis receiver placement in the form of a return waveform. As can be seen from the figure, the received waveform is considerably different from those corresponding to the receiver placed on the axis shown in FIGS. 4A-4C. In addition to high frequency, seen in FIG. 4D as a ripple, the signal is dominated by slow undulations. This low-frequency component is the result of the varying distance between the transmitter and the receiver as the main rotor completes rotation. Since the receiver captures both the wave reflected from objects in the scene and the direct wave from the transmitter, the change in the distance between the transmitter and receiver affects the overall level of the received signal. The greater the distance of the receiver from the axis of rotation, the greater the amplitude of this low-frequency undulation.

Figure 5A:
FIGS. 5A-5C show example results of processing a signal according to some examples.
Figure 5B:
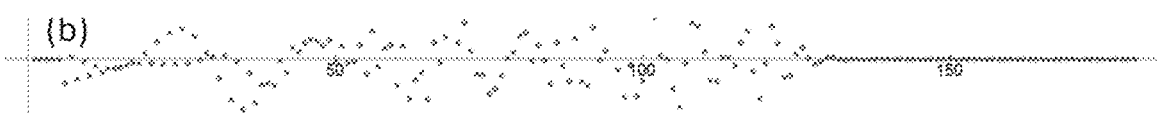
Figure 5C:
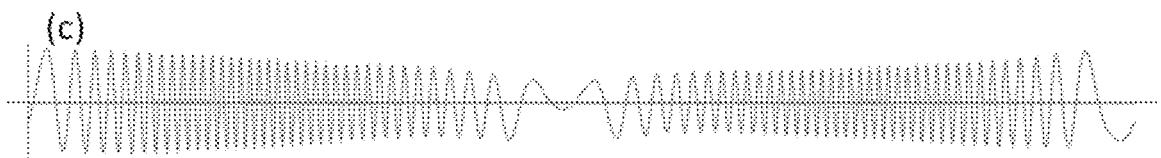

The disparity in frequency between the signal resulting from the variable transmitter/receiver distance and one carrying information about the scene allows the use of spectral filtering to separate the two. FIG. 5A shows the amplitudes of the first 180 coefficients in the Fourier expansion of the periodic signal of FIG. 4D. As can be seen from FIG. 5A, the signal is dominated by low-frequency components. Setting the first five components to 0 allows displaying the variable amplitude of the remaining significant components (FIG. 5B). By using Fourier coefficients of FIG. 5B, the signal is reconstructed with inverse Fourier transformation, and the result is shown in FIG. 5C. The waveform of FIG. 5C is now similar to the original pattern of FIG. 4A, where an on-axis receiver was used. This result indicates that once spectrally filtered, the same numerical techniques will be applicable to the reconstruction of the 3D scene from captured waveforms independent of whether the receiver is placed on or off axis of the main rotor. In addition, the low-frequency components of the captured signals need not be discarded: they contain information about the position of the transmitter with respect to the receiver. By combining this low-frequency information obtained from multiple receivers distributed on the aircraft (e.g., on the fuselage of the aircraft), the position of the main rotor, on which the transmitter is mounted, can be reconstructed in real time. Thus, the low-frequency component can be used to obtain rotor-state information.

The examples shown above, and also described in various embodiments below, include a waveform generated using an electromagnetic wavelength generator that generates 0.77 GHz waves. However, this was used to scale the testing described to a more workable scale. As described herein, certain embodiments of the invention use millimeter wave frequencies, such as 77 GHz, for image capture and reconstructions.

In some examples, separation of low-frequency and high-frequency signals (e.g., formed using receivers not at the axis of rotation of the main rotor) may be performed at the front end of the receivers, in the analog domain. This may assist in preserving the dynamic range in the digitized high-frequency signal since, (see, e.g., FIG. 4D), the received signal may be dominated by the low frequency components that would 'consume' bits of resolution if the filtering were to be done in the digital domain.

The spectral filtering described above may not affect the ability to recover spatial information of the scene. Thus, the signal may be split into high-frequency and low-frequency components at the receiver stage, see FIG. 16, in the analog domain to preserve the bit resolution, or dynamic range. The two resulting signals may then be processed in parallel (e.g., in the digital domain) to obtain both the 3D scene reconstruction and the rotor state in real time. See, e.g., FIG. 16.

Signals received by distributed antennas (e.g., a plurality of receivers) offer sufficient variability to afford accurate 3D scene reconstruction. The information carried by these signals may be converted to a depiction of 3D positions of objects in the scene. During testing, a simple numerical approach yielded sufficient quality to ascertain the resolution and object-placement accuracy commensurate with estimates obtained in preliminary research. More complex reconstruction algorithms may provide even higher quality 3D reconstruction in addition to improving computational efficiency so as to obtain real-time imaging. The reconstruction may be performed via parallel processing such that the performance will benefit from use of and advances in Graphic Processor Units, Application-Specific Integrated Circuits (ASIC), and Field Programmable Gate Array hardware (GPU/FPGA) to accelerate computation.

Numerical modeling tools allow a reconstruction of the scene with arbitrary placement of objects in the scene and an arbitrary placement of receiver antennas on the fuselage. In addition, in some embodiments, the system allows for simultaneous transmission and detection of multiple frequencies. For example, range resolution may be obtained by using frequency diversity in the illuminating wave (e.g., using a plurality of transmitters each generating different frequencies and processing the resulting plurality of respective beat signals) whereas elevation resolution may result from distributing the receiver array vertically on the fuselage. Exemplary details on the reconstruction and resolution estimates are provided below.

In some embodiments, the operational wavelength may be scaled to reduce computational burden and provide rapid results. In this mode of operation, an approach was developed and tested for the reconstruction of the scene from the captured waveforms. Reconstructions were performed in the azimuth, range, and elevation directions in order to estimate system resolution and accuracy. In developing the reconstruction algorithms, spectral separation of the signal carrying information about the scene (high frequency) from the signal with information about the rotor state (low frequency) was used. Below, further details are provided on specific testing performed and results obtained.

One example reconstruction technique starts with the expression for the waveform captured by a receiver $$\psi(\phi) = \frac{1}{r_{sd}} e^{i\frac{\Omega}{c} r_{sd}} + \sum_o \frac{1}{r_{so} r_{od}} e^{i\frac{\Omega}{c}(r_{so}+r_{od})} S_o, \qquad (1)$$

where $\phi$ is the angular position of the transmitter with respect to the axis of rotation of the main rotor, $\Omega$ is the RF frequency of the transmitter (the source of RF wave), $r_{sd}$ is the distance between the transmitter and the detector (receiver), $r_{so}$, $r_{od}$ are the distances from source to object and from object to detector, respectively, c is the speed of light, $S_o$ is the scattering cross-section of object o and the sum runs over all objects in the scene. At the receiver, the envelope of the high frequency signal of Eq. (1) is found using a square-law detector $$E(\phi) = |\psi(\phi)|^2. \qquad (2)$$

Note that equation (1) is an approximation that neglects the delay between the transmission of the waveform from the source and its arrival at the receiver due to the finite speed of light. In the situation analyzed here, this delay can be neglected thanks to the short distances and low speeds of the moving elements. For example, the delay corresponding to the round trip at the limit of the range of interest tested (200 meters) is about 1.33 microseconds. During this time, a transmitter moving at the speed of sound (the upper limit of the linear velocity of a transmitter mounted at the tip of a main rotor blade) would translate by 0.4 millimeters, which is about 1/10-th of the wavelength of the millimeter-wave radiation contemplated for use in various embodiments. The resulting phase deviation is considered sufficiently small and may be ignored in certain implementations. Nonetheless, in other implementations of the system, the correction due to this delay may be implemented if deemed necessary to achieve desired accuracy.

Returning to Eqs. (1) and (2), in one embodiment, a goal of the reconstruction is to find the positions of all objects in the scene. To this end, the scene is divided into a finely meshed grid indexed with a vector r, and Eqs. (1) and (2) are cast in the following form $$E(r_s, r_d, \Omega) = \qquad (3)$$
$$\left| \frac{1}{|r_s - r_d|} e^{i\frac{\Omega}{c}|r_s - r_d|} + \sum_r \frac{1}{|r_s - r||r - r_d|} e^{i\frac{\Omega}{c}(|r_s - r|+|r - r_d|)} S(r) \right|^2,$$

where the sought-after scattering cross-section distribution S(r) is now a function of the position r in the scene. An equivalent of a point-spread function is obtained from Eq. (3) by assuming a single scatterer in the scene with a unit cross-section, $S(r)=\delta_{r,r'}$, so that $$E_1(r_s, r_d, r, \Omega) = \left| \frac{1}{|r_s - r_d|} e^{i\frac{\Omega}{c}|r_s - r_d|} + \frac{1}{|r_s - r||r - r_d|} e^{i\frac{\Omega}{c}(|r_s - r|+|r - r_d|)} \right|^2, \qquad (4)$$

and by normalizing the result $$\hat{E}_1(r_s, r_d, r, \Omega) = \frac{E_1(r_s, r_d, r, \Omega)}{\sum_{r_s} E_1(r_s, r_d, r, \Omega)}. \qquad (5)$$

Equations (1), (2) and (3) have a form similar to an expression used in describing an optical hologram formation. Therefore, to reconstruct the scene, computational reconstruction of the scene inspired by holographic free-space reconstruction may be used. Thus, an approximate distribution S(r) is obtained using the following formula $$S(r) = \sum_{r_d,\Omega} \sum_{r_s} E(r_s, r_d, \Omega) \hat{E}_1(r_s, r_d, r, \Omega), \qquad (6)$$

where S(r) represents the approximation of the scene S(r). Expression (6) is the basic formula used for the reconstruction of the scene given the simulated received waveform $E(r_s,r_d,\Omega)$ of Eq. (3). In addition, prior to reconstruction, the received waveform $E(r_s,r_d,\Omega)$ is high-pass filtered to extract the portion of the received signal that carries information about the scene. In addition to integrating over the source position (sum over $r_s$ in Eq. (6)) outputs of multiple receivers are incorporated in the reconstruction by adding the individual reconstructions (sum over $r_d$ in Eq. (6)), and contributions from different frequency responses are included in a similar fashion (sum over $\Omega$ in Eq. (6)).

Other algorithms based on approaches known in the art may be employed to reconstruct the 3D scene. For example, iterative approaches that vary the estimated scene and use forward processing to obtain the closest approximation of received signals may be employed. Examples of such approaches are well known in fields such as computed tomography and include algebraic reconstruction technique (ART), also known as Kaczmarz method, and multiplicative ART (MART) algorithms.

To obtain a measure of real-world performance of a system based on the examples described here, testing was performed with noise in the computer simulations of the reconstruction, as described further below.

Using the approach to scene reconstruction described above, the holographic imaging system described herein may recover information about a recorded scene. In addition, the reconstruction quality may be improved with an increased number of receivers and frequencies used for reconstruction.

Figure 6A:
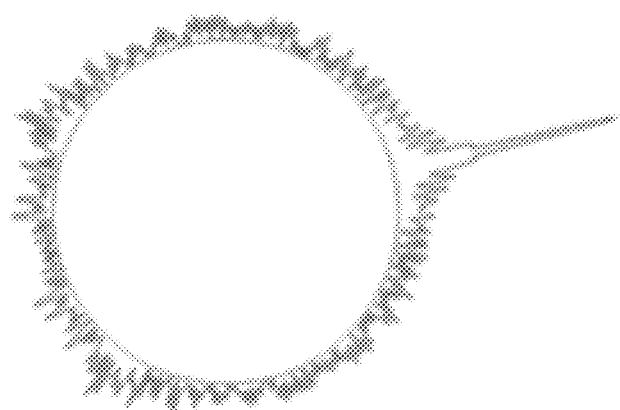
FIG. 6A shows an example linear reconstruction along the azimuth direction for a single frequency and a single receiver, according to one example.
Figure 6B:
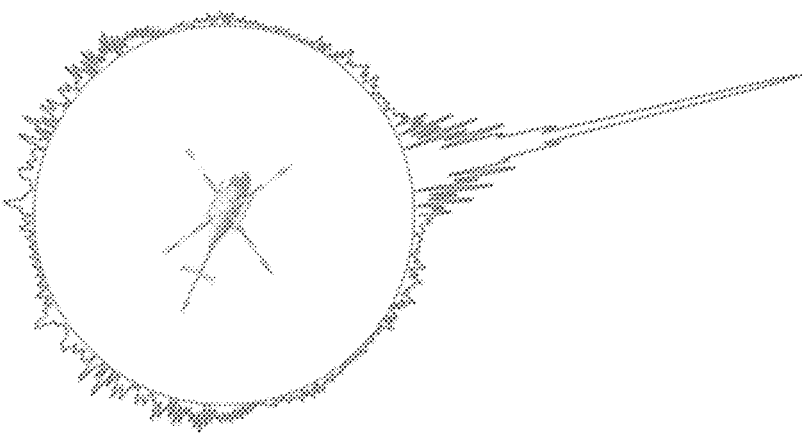
FIG. 6B shows an example reconstruction based on an average over seven different frequencies.

For example, a plurality of signals may be derived from a plurality of generated electromagnetic waves to result in improved image reconstruction. For example, the signals may be averaged to result in an averaged signal that better represents the reconstructed image. An example of an azimuthal reconstruction of a scene containing a single object can be seen in FIG. 6A. In this example, a single object was placed at a distance 50 meters from the helicopter. FIG. 6A shows a linear reconstruction along the azimuth direction for a single frequency and a single receiver. FIG. 6B, on the other hand, shows a reconstruction based on the average over seven different frequencies (e.g., which can be generated by seven different transmitters), but still a single receiver.

These figure clearly shows a sharp spike of the signal in the direction of the object in the scene. There is also some fixed-pattern 'noise' visible outside of the object. This noise is uncorrelated between the different reconstructions and is suppressed by taking the average of the results obtained from each frequency and each antenna position. The effect of the averaging over frequencies shown in FIG. 6B illustrates the improvement in the quality of reconstruction in terms of suppressing the noise and enhancing the amplitude of the signal.

Figure 6C:
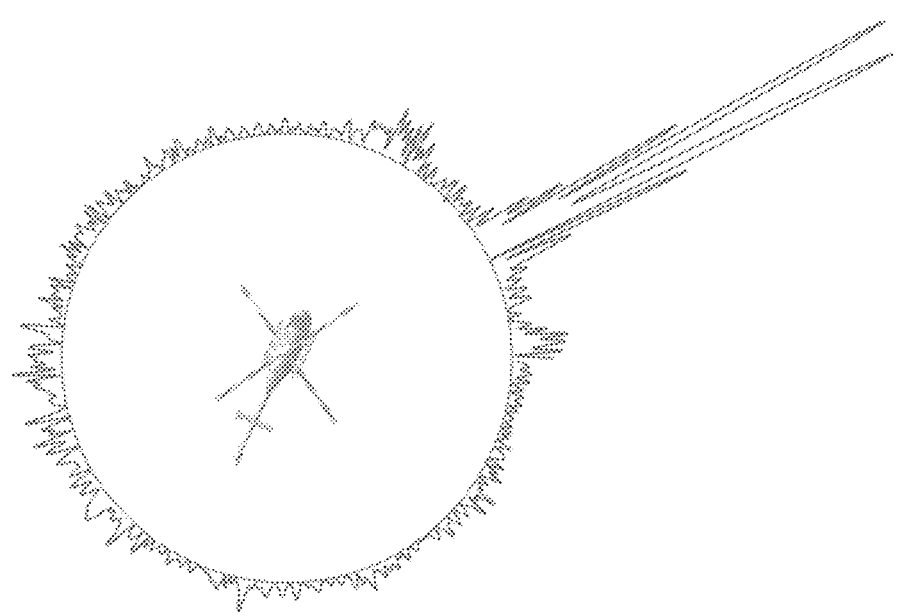
FIG. 6C shows an example reconstruction of a scene having two objects.

FIG. 6C shows an example reconstruction of a scene having two objects. More specifically, FIG. 6C shows a reconstruction of a scene at a frequency 0.77 GHz with two objects present at a distance 50 m, separated from one another by about 2 m.

With the use of 77 GHz, it is expected that objects separated by 2 cm from one another could be resolved at a range of 50 m. In certain simulations, a single frequency 0.77 GHz, and seven receivers placed at various distances from the main-rotor axis were used, consistent with the dimensions of the helicopter. FIG. 6C shows the reconstruction of such a scene with two objects where spectral filtering was applied to the received signal as discussed above. This illustrates the ability to resolve such closely-spaced objects that are consistent with simple estimates of the system performance.

In additional testing, a scene with a single object at a distance of 20 m from the helicopter and the reconstruction algorithm described above was applied to produce linear graphs along a range direction (or radial distance). A single receiver and different frequencies were used to produce several different reconstruction traces such as the one presented in FIGS. 7a-7c.

As shown, FIG. 7a depicts single-frequency reconstructions along the range direction, FIG. 7b depicts averaging over several frequencies yielding oscillatory reconstruction mostly concentrated around the position of the object, a 20-m range, and FIG. 7c shows an oscillatory trace smoothed-out by applying a low pass filter to the result of FIG. 7b.

The range reconstruction in FIG. 7a does not show a single peak where the object was present—at the 20-meters mark. Instead, a broad oscillatory trace is reconstructed. Combining the results obtained for several different frequencies allows the determination of an object's range. FIG. 7b shows an average of several single-frequency reconstructions similar to those of FIG. 7a. For example, FIG. 7b indicates that the broad-range oscillatory pattern is not correlated at distances where the object is not present and its contribution is cancelled out when averaged over frequencies. On the other hand, the oscillations add constructively in the vicinity of the object (e.g., the 20 meter mark). These high-frequency oscillations are easily smoothed out by applying a low-pass filter to obtain the reconstruction of FIG. 7c, where a pronounced maximum is present at 20 meters that corresponds to the distance of the object from the helicopter. Based on the width of the reconstructed peak at 20 m in FIG. 7c, it is estimated that at the frequency of 77 GHz, the range resolution is about 1.5 cm. This range resolution is maintained throughout the detection range-200 m or more as determined by the limit of detection. For example, the range resolution may be determined by the total bandwidth of the mmW radiation illuminating the scene, which in the illustrated example was less than 10% of the center frequency.

Figure 8:
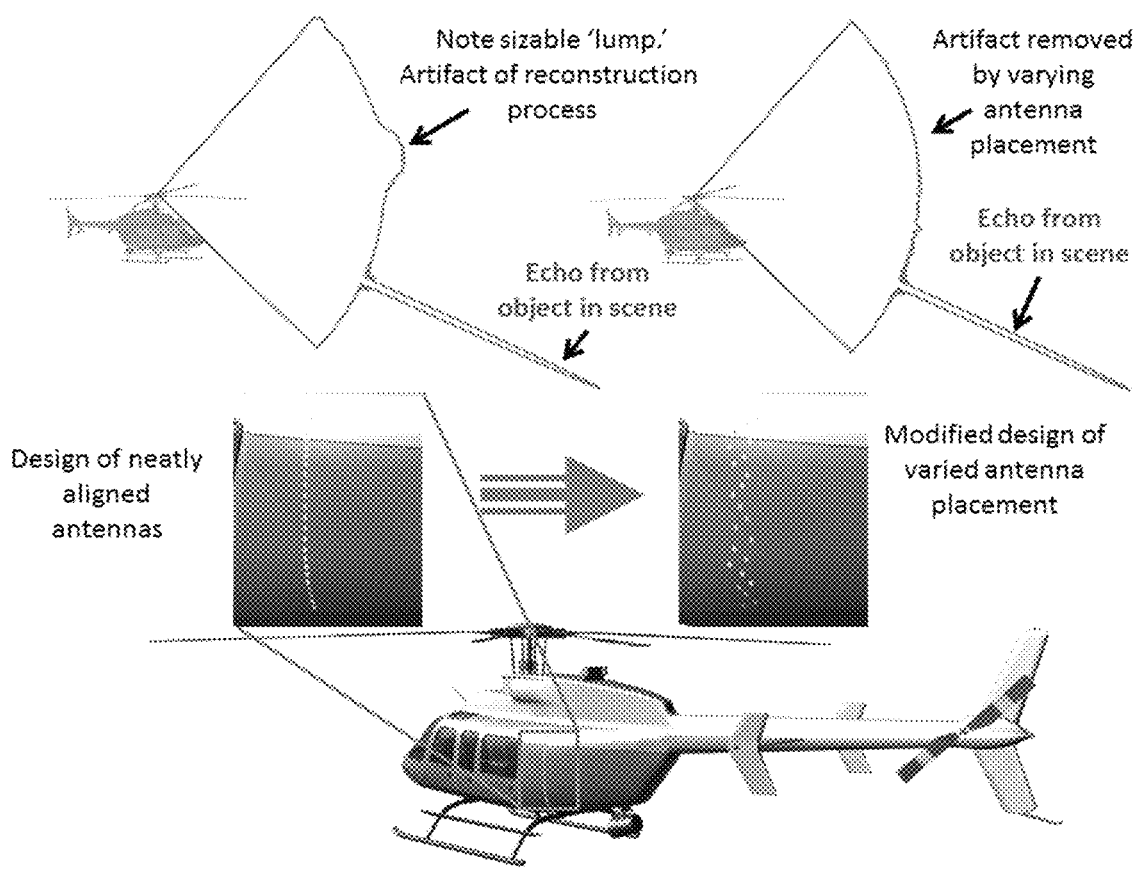
FIG. 8 shows reconstruction of the elevation of an object in a scene, according to one example.

In addition to azimuth and range, full 3D reconstruction includes the determination of objects' elevation, which may require extending the imaging aperture spatially in the vertical direction. Therefore, to achieve this, receiver antennas were placed in locations that were deemed approximately suitable for an aircraft. To improve the quality of the reconstruction, the placement of antennas may deviate from a strictly linear arrangement, as shown in FIG. 8. The deviation from strictly linear arrangement of receiver antennas may include displacing the antennas laterally from an axis (such as the vertical axis of the helicopter rotor). The lateral displacement of each of the antennas from the axis may be different from each other. In addition, the longitudinal displacements (spacing along the axis) of each antenna from a neighboring antenna may differ for each pair of neighboring antennas. The antennas may be placed to avoid a regular array or spacing, so that no repetitive pitch of spacing between neighboring antennas is used. For example, the spacing of each of the antennas may deviate from a corresponding location of a regularly evenly spaced array by a corresponding randomized distance (e.g., confined to some maximum distance) and in a randomized direction (e.g., which may be confined to a location on the hull of the helicopter).

FIG. 8 shows reconstruction of the elevation of an object in a scene. Comparison of the reconstruction with arrays of linearly-arranged receiver antennas and an array where antenna placement deviates from linear arrangement are shown. The varying of antenna placement may reduce or remove reconstruction artifacts and dead zones.

For example, the result of FIG. 8, which shows the reconstruction of the elevation coordinate of an object present in the scene, complements the ability to obtain the azimuth and range. Together, these results demonstrate full three-dimensional scene reconstruction. Given the known properties of millimeter waves (mmW), which easily penetrate atmospheric obscurants such as dust, smoke, or fog, the real-time mmW holography may be used in assisting in helicopter pilotage and hazard avoidance, as well as for reconnaissance and other purposes. Furthermore, as demonstrated by the results of FIG. 8, the exact placement of the receiver antenna on the aircraft is not essential for the quality of the reconstruction. Indeed, random variation in placement may be desirable. Such property is expected to have a positive effects on both the feasibility to retrofit existing craft with the contemplated system, and on its serviceability. Furthermore, it is anticipated that the randomized placement of devices will have a positive effect on the aircraft stealth, if desired.

Figure 9A:
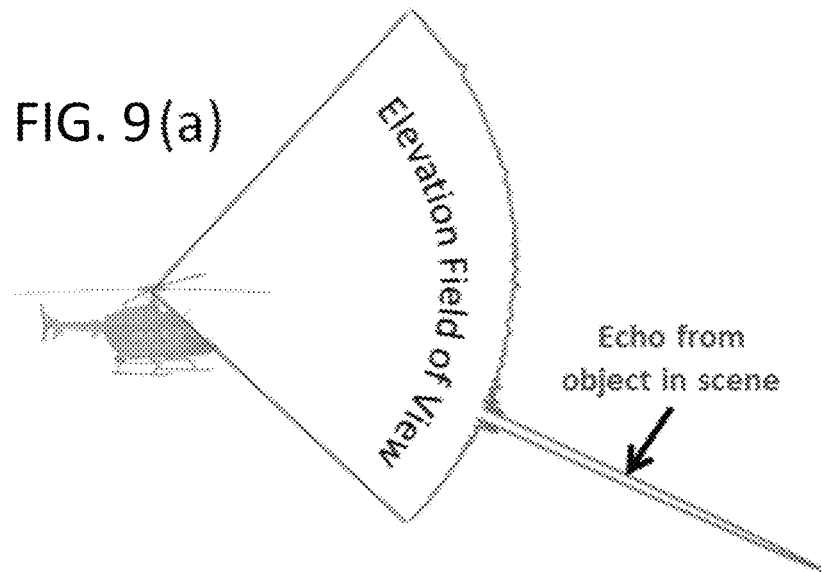
FIGS. 9a and 9b show a comparison of a reconstructed echo from a pure signal, and from a signal plus noise according to one example.
Figure 9B:
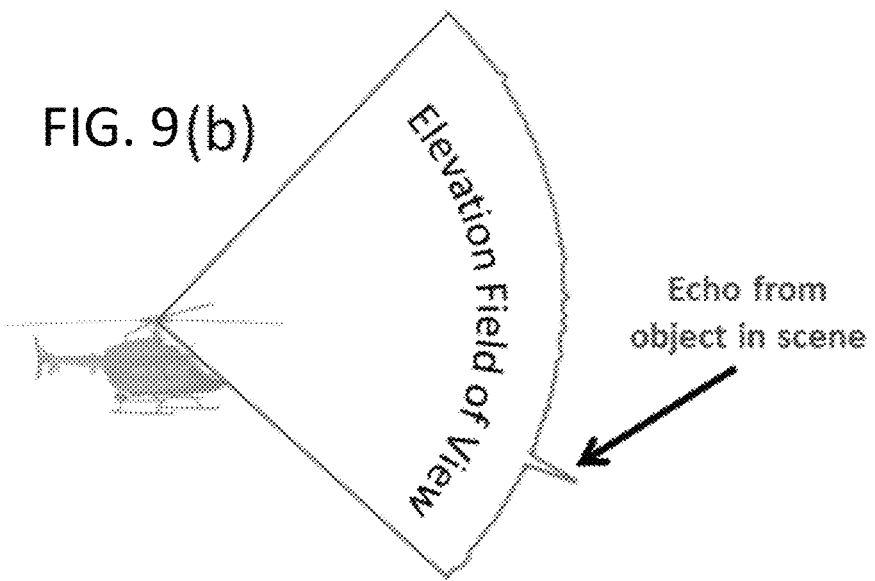

FIGS. 9a and 9b show a comparison of a reconstructed echo from a pure signal, and from a signal plus noise where the noise level was at 20% of the signal level.

As evident from FIGS. 9a and 9b, the presence of noise yields the reduction of the reconstructed amplitude (e.g., relative amplitude) of the echo from the object present in the scene. The pseudo-random variations in the reconstructed signal change little or are slightly suppressed in the presence of noise. This behavior indicates that increasing the noise level may degrade the system performance gracefully, and may allow its operation in the presence of real-world disturbances.

The system may employ high-gain antennas in the transmitter. Such antennas would 'illuminate' only a portion of the scene at a time and thereby may reduce the computational burden required for the reconstruction. Using such a beam with a transmitter mounted on a helicopter blade to illuminate the scene may alter the received echo and thereby may affect the quality of the reconstruction.

Figure 10A:
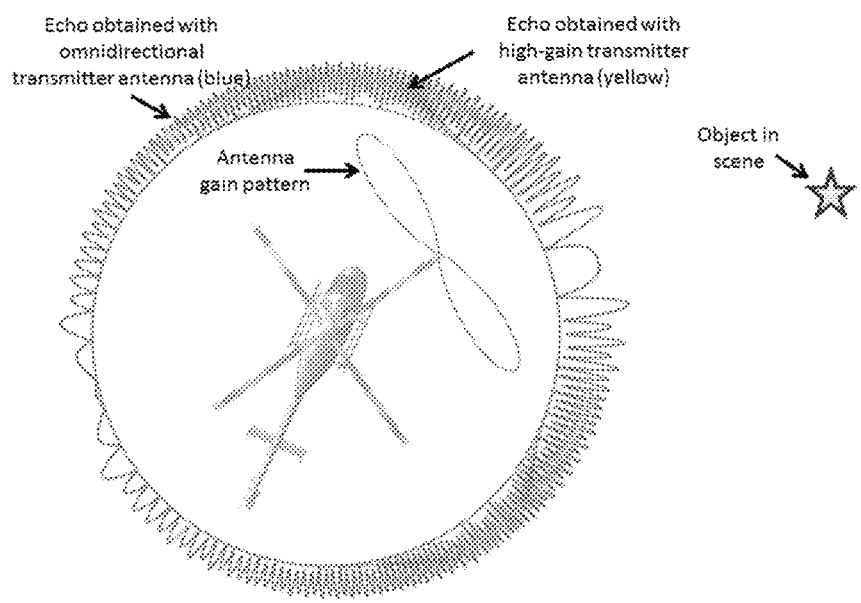
FIGS. 10A and 10B depict an echo received by a detector from an omnidirectional and high-gain transmitter antenna according to one example.
Figure 10B:
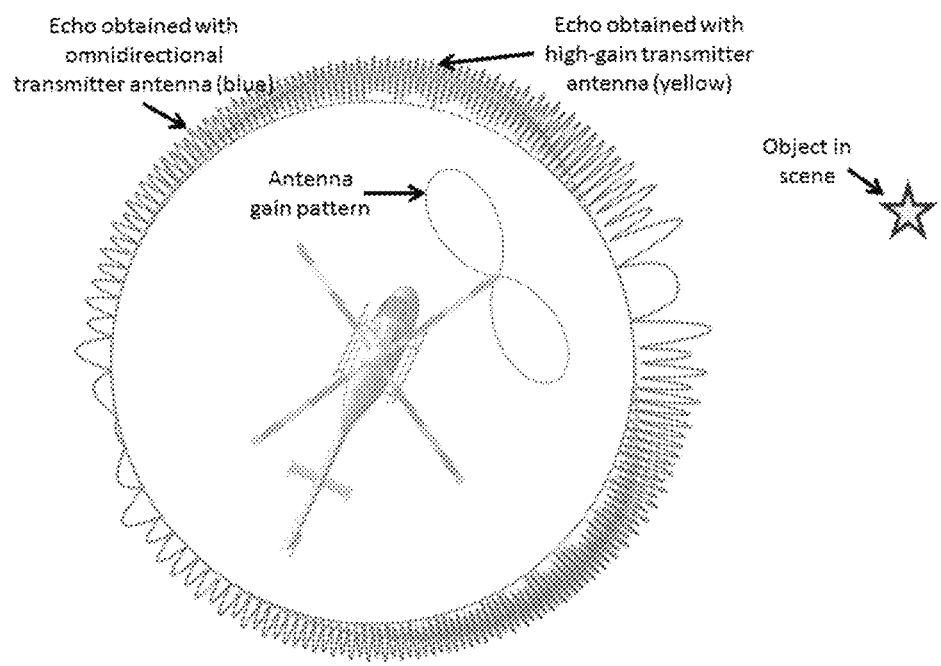

FIGS. 10A and 10B shows a comparison of the echo obtained when the transmitter is omnidirectional (curve shown surrounding the whole circle) with the echo obtained with the use of a high gain antenna having two main lobes, forward and backward, as schematically indicated in the figure. The amplitudes of the echoes are normalized to the same maximum value for comparison since normally a considerably higher amplitude is obtained for high-gain antenna. The beam-width of the high-gain antenna is about 30° in the case presented in FIG. 10A and 60° for the case in FIG. 10B, as illustrated schematically with a contour at the end of the rotor blade of the helicopter image. The echo received by the detector shows two distinct regions of high-amplitude oscillations. The phase of the oscillations in the high-gain echo matches that of the low-gain echo. Thus, FIGS. 10A and 10B depict an echo received by a detector from an omnidirectional and high-gain transmitter antenna. A single object 20 meters away from the helicopter is placed in the scene. The antenna gain pattern is shown schematically at the tip of the helicopter rotor blade.

Figure 11:
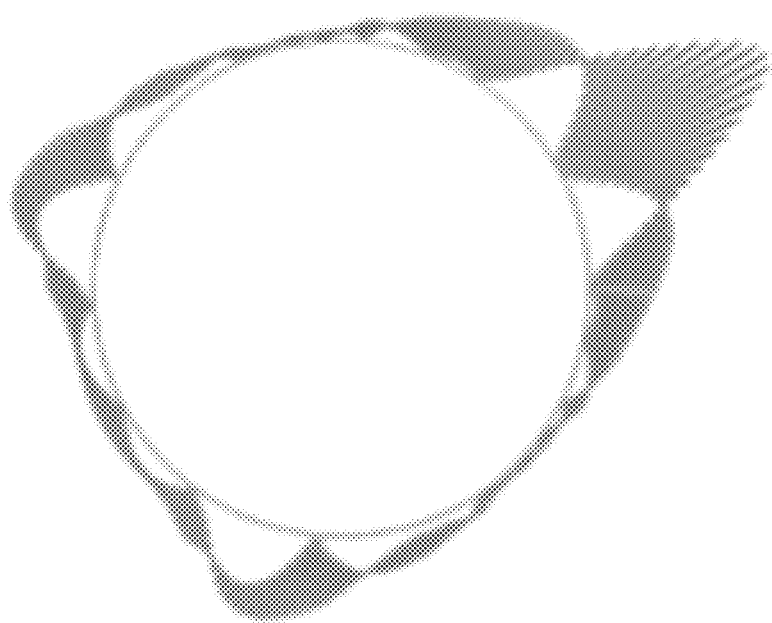
FIG. 11 shows a reconstruction from the echo provided by a high-gain transmitter using a single frequency transmitter according to one example.

To reconstruct the scene from the received echo using the high-gain transmitter antenna, a similar approach to that described above was used. The definition of the equivalent point-spread function in this example takes into account the varied profile of the transmitted field as a function of the angle. The reconstruction from the echo provided by a high-gain transmitter using a single frequency transmitter is shown in FIG. 11. To improve the quality of the reconstruction, multiple detectors and multiple frequencies may be used as in the case of finding the range and azimuth described above.

Figure 12A:
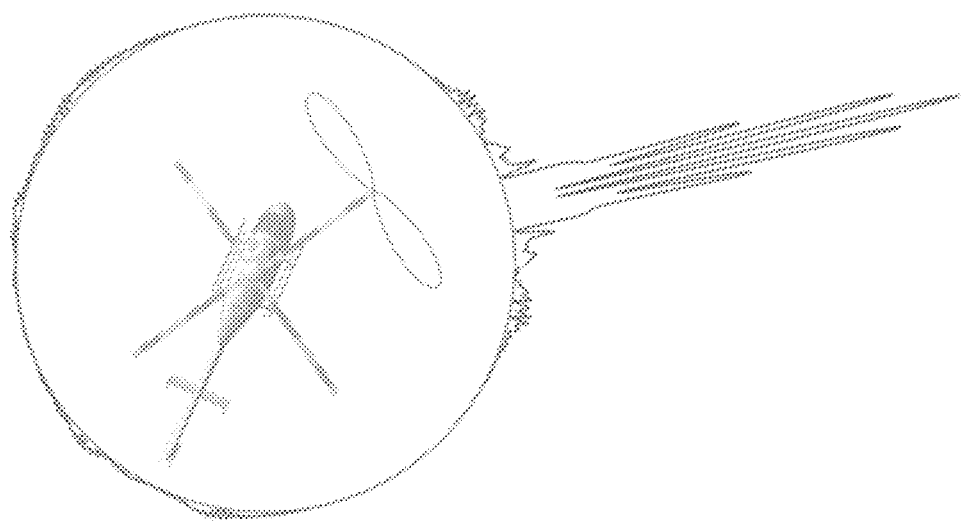
FIGS. 12A and 12B show reconstructions based on averaging, according to some examples.
Figure 12B:
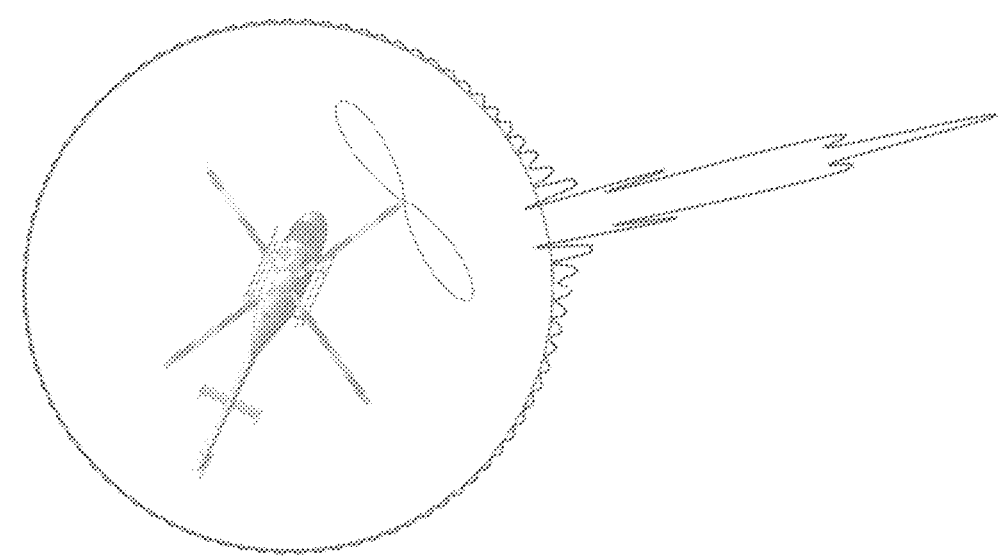

The averaging of such patterns over antenna placement and frequencies results in canceling the high-frequency oscillations in most regions except for the vicinity of the direction where the object is located. A direct average of these reconstructions is shown in FIG. 12A, which shows an example using multiple frequencies and multiple receivers, and demonstrates high suppression of the side-lobes as compared to the individual averages over frequencies alone, or receivers alone (receivers may also be described herein as detectors—e.g., electromagnetic wave detectors). However, FIG. 12A still shows multiple pronounced peaks in the vicinity of the direction corresponding to the object placement. These multiple peaks can be largely eliminated by spatial filtering of the reconstructed pattern as shown in FIG. 12B. The transmission beam has a width of 30° in this case. Increasing the number of detectors may further improve the quality of the reconstruction, such as use of more than 7, more than 20, more than 100 or more than 500 detectors.

Figure 13A:
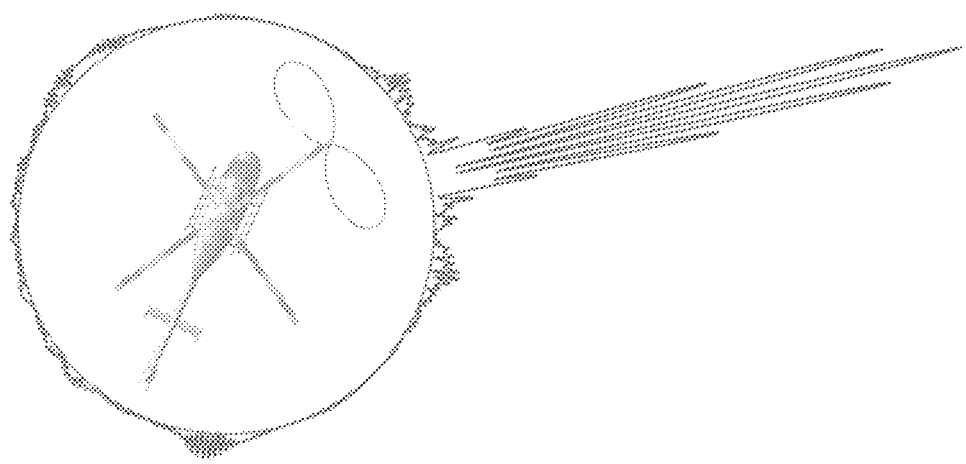
FIGS. 13A and 13B illustrate the reconstruction with a beam twice as wide as that of FIGS. 12A and 12B, according to some examples.
Figure 13B:
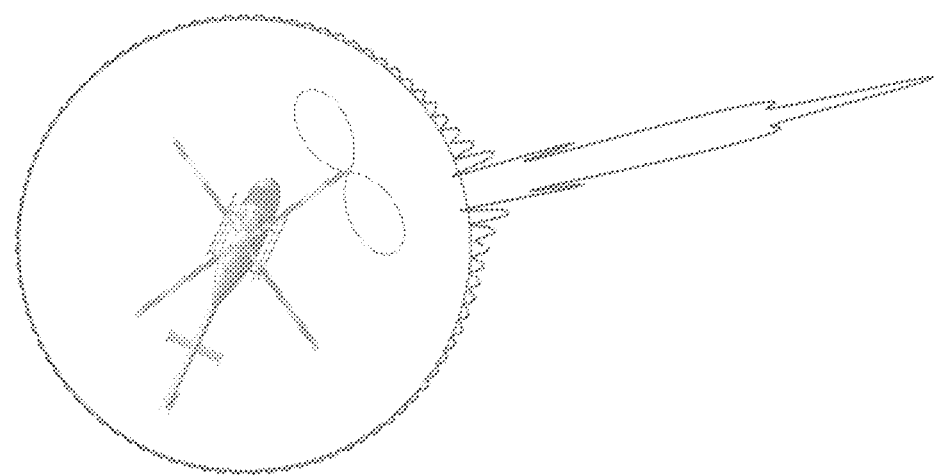

The results shown in FIGS. 13A and 13B illustrate the reconstruction with a beam twice as wide as that of FIGS. 12A and 12B (e.g., 60°). Although FIG. 13A appears to show more side-lobes in the immediate vicinity of the direction of the object, spatial filtering shown in FIG. 13B yields a reconstruction almost indistinguishable from FIG. 12B obtained using narrower beam.

Figure 14:
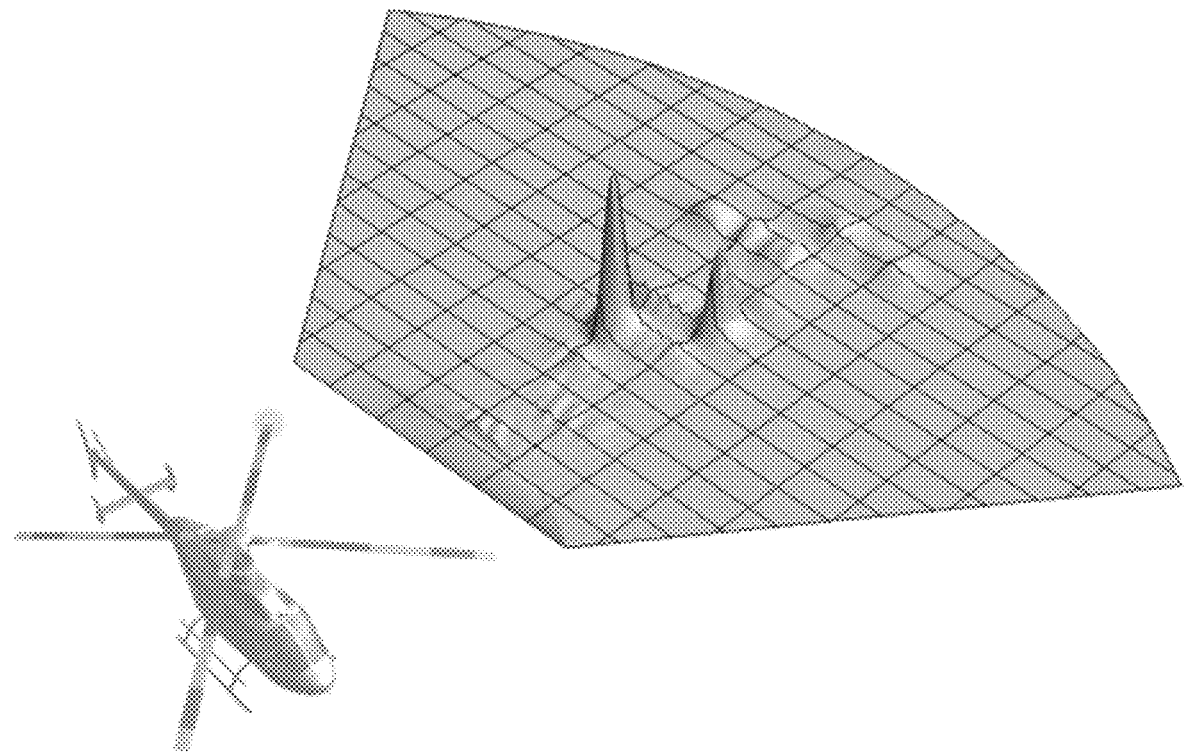
FIG. 14 shows a reconstruction including two peaks corresponding to the two objects in a scene, according to one example.

The results of linear reconstruction along the azimuth, range, and elevation directions presented above allow quantitative estimation of the anticipated performance of the system. For intuitive understanding of the ability of the system to provide faithful reconstruction of the scene, a visual representation of the reconstruction in more than one dimension is provided. One example of such a visual representation is for a scene with two objects separated both in range (3 m apart) and in azimuth (6 m apart) at a distance of about 22 m from the helicopter. Both frequency diversity and multiple receivers (seven frequencies, eight receivers) were used to arrive at the reconstruction shown in FIG. 14, which also incorporates the low-pass filtering in the range direction according to the procedure of FIGS. 7a-7c. The reconstructed area in this example covers the range between 12 and 35 meters and 72 degrees of the azimuth angle. As can be seen, FIG. 14 shows two peaks corresponding to the two objects in the scene. The objects are easily resolvable at this frequency and range. Scaled to 77 GHz, the separation of objects resolved with the fidelity of FIG. 14 would be less than 7 cm.

The holographic image reconstruction system described herein, and also described as a scanner, may be implemented by various hardware and software placed in different locations within or on a vehicle. For example, numerous locations are available on a helicopter for the transmitter and receiver antennas with supporting electronics. For the receiver, a clustered design may be used, where multiple receiver antennas coupled to their respective analog-processing units and ADC-s (described in more detail below) are combined into a single module, and multiple such modules may be distributed around the fuselage. Such receiver architecture may minimize any required modification to the platform while affording considerable flexibility in the placement of the receiver array.

The scanner may comprise on its receive side small discrete elements distributed around the fuselage and linked using low-frequency data cables. On the transmit side, the module may be small and light-weight, and may use only low-current power lines.

The design of the rotor blades may be able to accommodate a transmitter with a small form factor. In some helicopter designs, the tip of the rotor blade is removable and may be hollow. These features make them particularly suitable for the placement of the transmitter module.

Delivering electrical power to the tip of the rotor blade can be implemented particularly for the power levels required. There are presently systems in use that provide electrical power to the rotating parts by means of a battery pack attached to the rotor hub, or by brushes mounted inside the hollow hub.

For the receiver part of the system, a distributed aperture is well-suited for the helicopter platform. Numerous surfaces on the fuselage exist where the elements of a distributed receiver can be mounted. As with the transmitter, the mounting of the receiver elements may be facilitated by their small size and light weight. Furthermore, in case of composite panels that are transparent to millimeter waves, the receiver modules may be mounted on the inside of the aircraft and thereby eliminate any concern over protruding elements. For metal panels, the drilling of small openings (¼") for data and power cables may also be used as long as the structural integrity of the part is preserved. A single opening in the part (e.g., helicopter panel) may be used for a single receiver or a cluster of receivers. Using a single opening for a cluster of receivers may reduce the complexity of data and power wiring receiver connections of the system as a whole.

Figure 15:
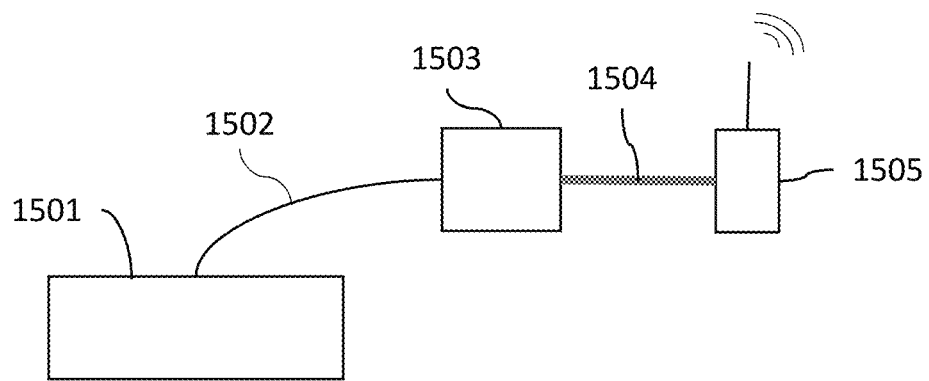
FIG. 15 is a block diagram depicting an example structure of an electromagnetic wave transmitter according to certain embodiments.

FIG. 15 is a block diagram depicting an example structure of an electromagnetic wave transmitter according to certain embodiments. As shown in FIG. 15, a transmitter includes a power source 1501, a power transmission line 1502, an electromagnetic wave source 1503, a waveguide 1504, and an antenna 1505. It should be noted that the power source

1501 and power transmission line 1502 may be considered not part of the transmitter, such that a transmitter may refer to only the electromagnetic wave source 1503, waveguide 1504, and antenna 1505. For example, the power source 1501 may be a power source of the vehicle, such as a helicopter engine, battery, or auxiliary power. Alternatively, the power source 1501 can be a dedicated battery or power generator for the transmitter. As discussed above, one example power source 1501 is a battery pack attached to the rotor hub. Power transmission line 1502 can be, for example, a wire or other conductive component for transferring power from the power source 1501 to the electromagnetic wave source 1503, and in some embodiments (though not explicitly shown in FIG. 15) to the antenna 1505. For example, a power line may be extended through a blade of the rotor to provide power from the power source 1501 to the transmitter. Electromagnetic wave source 1503 may include circuitry for generating one or more electromagnetic waves having one or more frequencies. Examples of an electromagnetic wave source 1503 are described further below. Waveguide 1504 may be a material or materials that transfer waves generated by the electromagnetic wave source 1503 to the antenna 1505. Examples of waveguide 1504 are given below as well. In some embodiments, a waveguide 1504 is very short, or may be omitted such that the electromagnetic wave source 1503 is directly connected to the antenna 1505. Antenna 1505 may be configured to transmit one or more electromagnetic waves generated based on the output from the electromagnetic wave source 1503. Example of antenna 1505 are described in more detail below.

In some embodiments, the tip of the blade may serve as the placement for the transmission antenna. However, since waveguides available for mmWs tend to be bulky, heavy, and lossy, their installation on the helicopter rotor may be undesirable. As a result, where mmWs are used, the mmW to be transmitted may be generated in close proximity to the transmitter antenna. For example, in some embodiments, the mmW source may be coupled directly to the antenna. An mmW transmitter with the average power of 100 mW may be adequate for detecting an object with a cross-section of about 100 cm$^2$ at a range of 200 m, assuming integration time (e.g., equal to a period of rotation of a helicopter blade on which a transmission antenna is mounted) of 100 ms or more.

One example of an electromagnetic wave source 1503 for generating mmW radiation at such power levels is the Gunn diode, where a single electronic component is responsible for the high-frequency generation. The simplicity of the Gunn diode approach has various benefits. For example, a single element properly biased and coupled to a resonator and an antenna is all that is needed for the generation of frequencies in the mmW range. In addition, the entire package would be lightweight and in the simplest embodiment may need only a couple of electrical leads from a DC power source. Microsemi MG1038-16 is a W-band gallium arsenide gunn diode with a minimum CW output power of 50 mW. This is a cathode heatsink design and has a typical operating voltage of 5 volts at a current of 0.45 to 1.2 amps.

The Gunn diode may be coupled to a transmission antenna 1505. In some embodiments, liquid-crystal polymer (LCP) may be used as the material for fabricating such antennas. LCP is a paper-thin substrate that is light-weight and flexible, and therefore can be readily integrated into the rotor blade. The antenna may be patterned in a metal layer (copper) supported by the LCP substrate. Waveguides may be obtained by using double-sided metallization of the LCP substrate and strategically placing vias as the sidewalls of the waveguides. This yields a substrate-integrated waveguide (SIW), an analogue of rectangular waveguides with the RF energy propagating between the top and bottom metal layers and delineated by the vias laterally.

To achieve high-gain antenna operation, the incoming mmW signal may be split using the SIW waveguides to feed an array of planar antennas patterned on the same substrate. For example, waveguide splitters that feed four output ports may be used. In one embodiment, this results in a low return loss (reflection) of better than −15 dB over the bandwidth in excess of 7 GHz in addition to high transmission (0.9 dB excess loss), which makes such design suitable for this application.

To radiate the mmW energy into free space, Vivaldi antennas may be used. Such antennas may be formed using patterns of partially-overlapping quarter ellipses on the opposite sides of the LCP substrate. The Vivaldi antenna design has high radiation efficiency, broad bandwidth, and the amenability to integrate on the planar LCP substrate. For example, a two-element array may be used. In testing, a low return loss over broad bandwidth showed a high radiation efficiency of this array. The results also included a highly asymmetric beam in this conformal design: The beam width was 20 degrees in the E plane and 80 degrees in the H-plane. Such asymmetry may be useful in the operation of the mmW holography system for instantaneous broad illumination in the elevation direction, and sweeping due to the rotor movement in the azimuth direction. In this example, the return loss was better than −10 dB over 12 GHz. Beam widths in the E and H-planes were 20 and 80 degrees, respectively. maximum radiation gain was 9.5 dBi at 77 GHz.

In some embodiments, by increasing the number of antenna elements in the array, the beam width in the E-plane can be further reduced with the commensurate increase in the antenna gain. For example, a four-element design may achieve this. In one example, the bandwidth of the four-element antenna array, as measured by the return loss covered the range from 65 GHz to 79 GHz. In this example, beam widths in the E and H-planes were 13 and 80 degrees, respectively. Maximum radiation gain was 12.5 dBi at 77 GHz.

These results allow design flexibility for a highly asymmetric beam width where the narrow plane is determined by the number of antenna elements and their spacing. In one embodiment, the physical size of a four-element design fits within one square inch and is literally paper thin. Such a postage-stamp-size antenna may have a negligible effect on the performance of a helicopter rotor.

Since commercially available oscillators, such as Gunn diodes described above, may use conventional rectangular waveguides, such as WR10, as the output, a transition element may be used to couple RF radiation from the source to our LCP-based antenna. In one example design, an SIW is first converted to a microstrip line before feeding into the rectangular waveguide with a substrate cut to match the window in the housing of the rectangular waveguide. The return loss of such design is about −12 dB at 77 GHz and allows broadband operation.

As indicated above, a transmitter, or a plurality of transmitters may be mounted at the tips of the rotor blades. Each transmitter may comprise, for example, a Gunn diode coupled to a transmitting antenna and powered by electrical leads running along the blade. Different transmitters can be set to different frequencies to cover a bandwidth, and different sets of receivers (described further later) can be tuned to the different frequencies, respectively, to record different signal patterns for the different generated frequencies. In certain embodiments, the weight of the Gunn diode is less than ¼ of a gram, whereas the associated waveguides, antenna and packaging add to a total of less than 10 grams per transmitter. One example Gunn diode requires 1100 mA of current at 5 V. To carry such current, a copper wire with a diameter of 0.8 mm may be used. 20 m of such wire adds about 90 grams to the weight. Thus the weight of a single transmitter mounted on a rotor blade is about 100 g. In some embodiments, eight such transmitters, distributed among the rotor blades, add about 800 g to the weight of the rotor. It should be noted that the transmitters do not necessarily need to be placed at the tips of the rotor blades, but some or all of the transmitters can be placed closer to a middle of the blades. In some embodiments, the transmitters used are placed at the ending 10% of a rotor blade, in a lengthwise direction, and/or at the ends of the rotor blades, within 1 meter of the terminal end of the rotor blades.

On the receive side, a receiver system may comprise a collection of modules, each module containing several antennas and corresponding signal channels. Each signal channel may amplify the incoming wave using a low-noise amplifier (LNA), mix it with a local oscillator (LO) to baseband, spectrally split the signals, and convert them to digital domain for transmission to a central location for processing (e.g., to an on-board computer).

Figure 16:
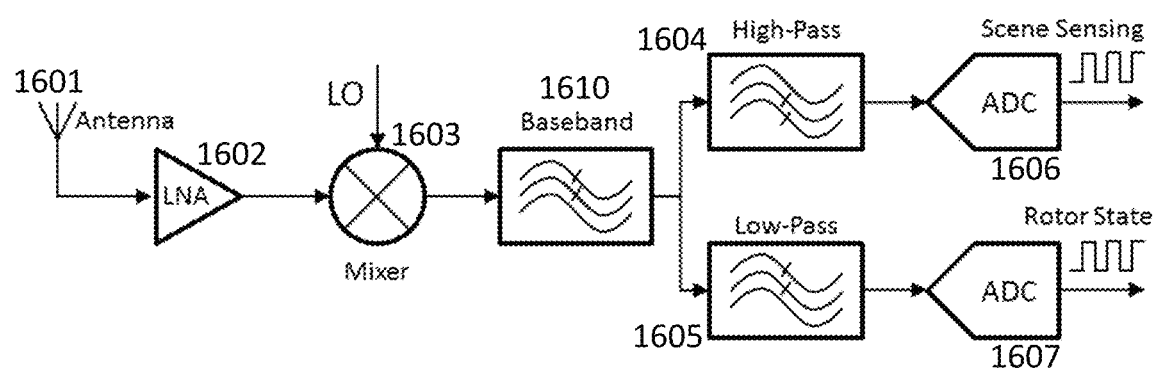
FIG. 16 shows a schematic diagram of a receiver, according to some embodiments.

A schematic diagram of this functionality is shown in FIG. 16. For example, a receiver may include an antenna 1601, a low noise amplifier (LNA) 1602 connected to receive a signal from the antenna 1601 and amplify the signal, a mixer 1603 connected to receive an output signal from the low noise amplifier and combine the signal with a local oscillator signal to form and output a baseband signal, a baseband filter 1610 to pass the low-frequency result of the mixing of LO with the signal amplified by LNA, a high-pass filter 1604 and low-pass filter 1605 for receiving the baseband signal and separating the signal into high frequency and low frequency signals, and respective analog to digital converters 1606 and 1607 for receiving the outputs from respective high-pass filter 1604 and low-pass filter 1605 and converting the signals to digital signals. The high-pass digital signal may be used for sensing objects and a scene, and the low-pass digital signal may be used for determining a state of the rotor. An example low noise amplifier 1602 includes model TGA4705-FC made by Qorvo. An example of mixer 1603 includes model TGC4702-FC also made by Qorvo, and an example of analog to digital converters 1606 and 1607 include model LTC1867 made by Linear Technology.

Figure 17:
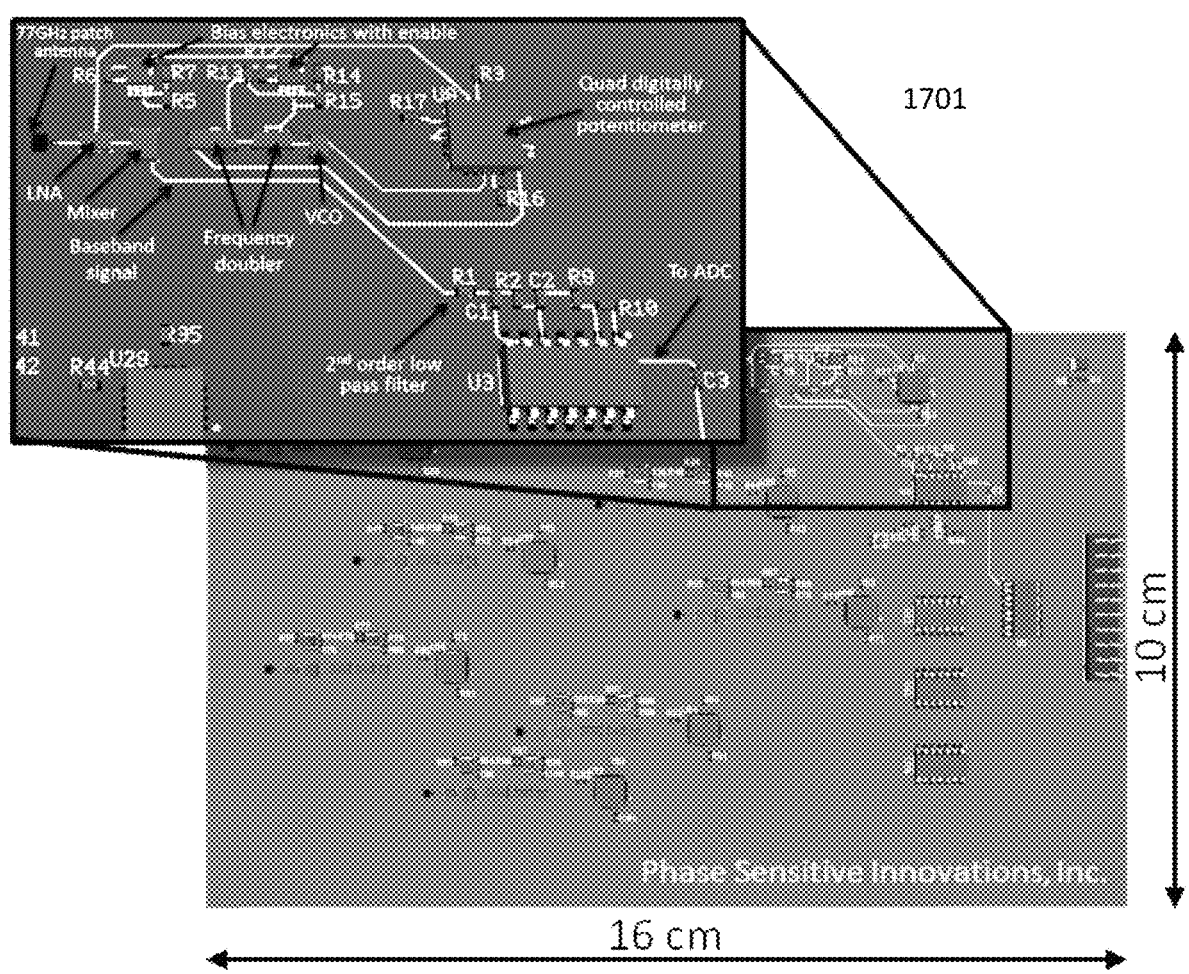
FIG. 17 depicts an example board layout for a receiver module, according to some embodiments.

FIG. 17 depicts an example board layout for a receiver module 1701. Receiver module 1701 includes eight receiver channels with supporting electronics, as can be seen in FIG. 17. It occupies an area of about 10 by 16 cm—smaller than a human hand. The LCP substrate used to support the electronic components may be paper-thin, lightweight, and flexible, and can conform to the contour of the aircraft.

Data generated by the receiver modules may be collected by a central computer (e.g., an on-board computer) for recording the data, and for processing and generation of the 3D depiction of the scene surrounding the aircraft in real time. The resulting imagery and other relevant data, including the information on rotor state, may be transmitted to the pilot and/or to a navigation computer. Since the algorithm to be used for scene reconstruction is highly parallelizable, computer hardware such as an nVidia GPU, in addition to custom field-programmable gate arrays (FPGAs), may be utilized for processing. Other computer hardware and software may be used as well, or as an alternative.

As a result of processing the signals received by the receiver or receivers, information about one or more objects in a scene may be determined. The result of this information may be used in many ways. For example, a 3D depiction of the object and scene outside of the aircraft may be displayed to the pilot of the aircraft. Alternatively, or in addition, the information may be used to detect objects too close to an aircraft and generate an alarm to warn the pilot. In other examples, the real time 3D information may be used to perform object detection and object identification. For example, foreground objects may be distinguished from background objects. The foreground objects may be identified (e.g., by detecting movement, size, shape, location) and tracked. User generated rules may be applied to the detected objects to detect events, where detected events may be used to generate an alarm or transmission of the 3D depiction to another location for review (e.g., to a command center for review). For example, detection of moving objects larger than a car but smaller than a truck may be a cause transmission of the 3D depiction to a central location. Detection of moving objects having a size larger than a truck may cause an alarm and/or highlighting of the object on a display viewable by the pilot within the aircraft. Detection of an object that is moving and above ground level may cause an alarm and/or highlighting of the object on a display viewable by the pilot. Other uses of the resulting 3D depiction may include generation of reports, such as mapping of the location and size of ground structures, such as houses, buildings, antenna towers, etc. The object detection and/or 3D mapping of the environment may also be used in autonomous navigation of the aircraft. In this case, the information about the scene may be fed to the navigation computer to aid in platform pilotage, obstacle avoidance, payload retrieval/delivery or, in the case of military platforms, targeting and/or friend/foe identification.

Figure 18:
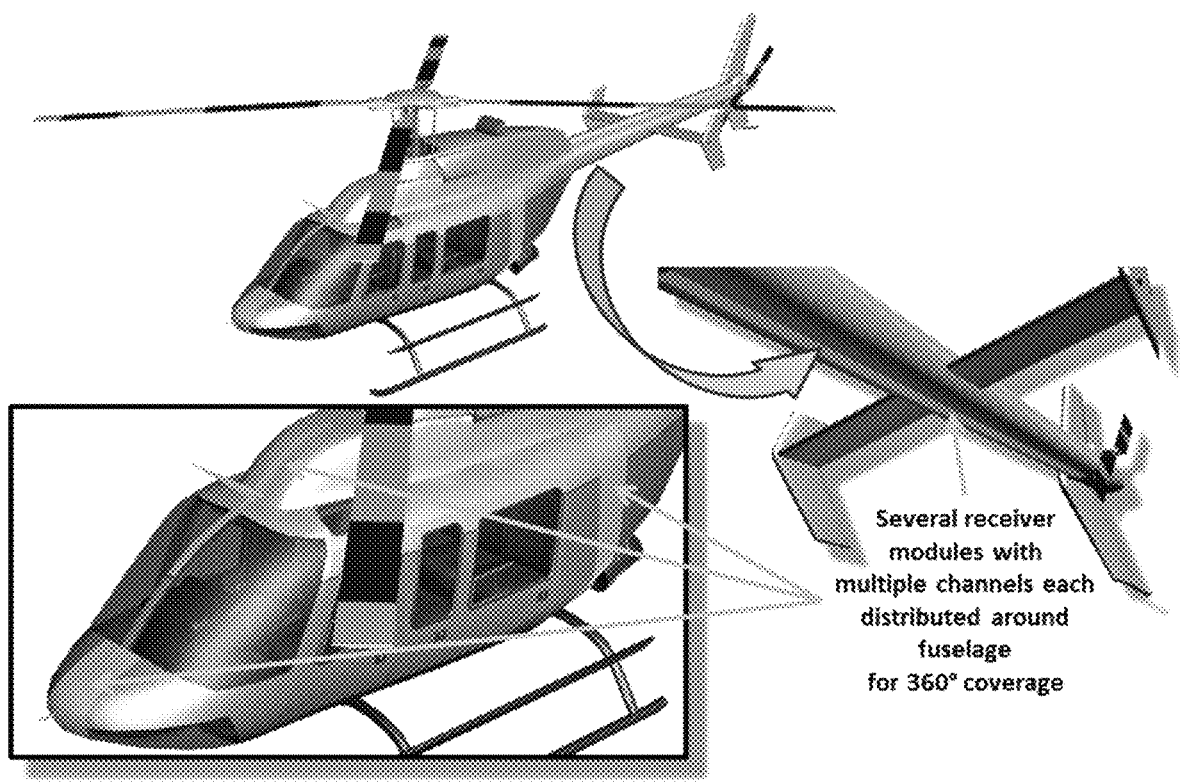
FIG. 18 depicts an example of receiver modules placed on an outside of a helicopter, according to some embodiments.

FIG. 18 depicts an example of receiver modules placed on an outside of a helicopter. For example, receivers may be distributed around the fuselage of a helicopter. The set of receivers shown in FIG. 18 comprises receiver channels integrated into modules where each module comprises between eight and two hundred channels. The complete system may include a total of one thousand receiver channels. The modules may be flat—no more than a couple of millimeters thick—and can conform to the contours of the fuselage. The module width and length may be adjusted depending on the availability of space at a particular location within the body of the aircraft on which they are placed. For example, the shape of the modules may be adjusted to conform to the fuselage. Accordingly, in some embodiments, the length of a receiver module may be between 10 cm and 1.5 m, and its width between 10 and 25 cm. The weight of electronic parts for a single channel is estimated at 1.62 grams that include the integrated circuits (LNA, VCO, mixer, frequency doublers, ADC) in the standard package or chip form, as well as the LCP substrate. Protecting (packaging) the fabricated modules may add no more than 7 grams per channel. As shown in FIG. 18, receiver modules may be placed on a bottom, sides, front, and top of the aircraft, in order to more completely cover visualization of the aircraft surroundings. As mentioned previously, a plurality of sets of receivers (e.g., as may be included in a plurality of respective receiver modules) can be used to tune to a plurality of respective transmitters, to record different beat signals resulting from different respective transmission frequencies. These different beat signals can be used to better determine information about objects in a scene and/or an image of a scene. The plurality of transmitters may be disposed on one or more blades of a helicopter. Also, though these modules are shown, as discussed and shown above, individual receivers may also be placed at certain locations on the aircraft. The various receivers may obtain power from the aircraft, for example, through leads or wires connected to a power source of the aircraft.

In certain embodiments, power consumption is found by adding the current draw of individual components constituting a receiver and multiplying it by the highest voltage required for any of the components. In addition, sharing of components should be accounted for: The ADC chip supports eight channels, whereas each of the VCO-s and the frequency doublers provide the LO signal to four channels. As a result, the current draw and the power requirement per channels in this example are 200 mA and 1 W respectively. The table below summarizes these estimates, where module length is between 10 cm and 1.5 m depending on the location on the platform, and the system uses from 4 to 8 modules per platform.

| Component | Size | Weight | Power demand |
|---|---|---|---|
| Integrated circuits + LCP substrate | 20 cm² | 1.6 g | 1 W (200 mA at 5 V) |
| Packaging of the modules | 2 mm thick | 7 g | — |
| Total per channel | — | 8.6 g | 1 W |
| Total per platform (one thousand channels distributed throughout four to 8 modules) | — | 8.6 kg | 1 kW (*) |

As indicated by the asterisk above, most of the power consumption in the receiver is due to the LO-s that comprise a VCO and two frequency doublers each, and account for 70% of the power draw. An alternative way to generating the LO may be by optical means in a central location and distributing it by optical fibers to the receiver modules. Such an approach may reduce the total power consumption to about 500 W while approximately doubling the total weight of the receiver system.

The holographic imaging system including the various components describe above may be used for real-time millimeter-wave holographic scanner and its application for helicopter pilotage and hazard avoidance. The obtained signals may contain high-accuracy 3D information about the location of objects surrounding the aircraft, as well as the rotor state. In some implementations, the system may be mounted on an aircraft, such as a helicopter, but it may also be mounted on other vehicles or be mounted to a fixed location (e.g., on a radar tower or building). The mounting of the system on an aircraft may have minimal effect on the aircraft's performance thanks to the small size and weight of the components and the considerable flexibility in the component placement. In some examples, the system is implemented to transmit and receive millimeter-wave radiation, although the system is also applicable to other spectrums of radiation. The propagation of millimeter waves is essentially unaffected by environmental conditions such as dust, smoke, night, or day while allowing high resolution imaging. As such, millimeter waves are ideally suited for imaging in degraded visual environment that may be encountered by helicopter pilots flying challenging missions and may assist in delivering full 3D information on the helicopter surroundings in all environmental conditions.

Benefits and results from experimentation and testing of the system include the following: reconstruction of a 3D scene based on the signals received by the distributed sensor array from transmitters located on the rotors; 3D accuracy, resolution, and range are suitable for helicopter pilotage; information about the rotor state can be recovered from the received signals; the system can be used in all-environment operational conditions, due to the robust nature of a W-band (i.e., 77 GHz) signal, while the choice of frequency is flexible; the system can be adapted to various platforms; the system leverages commercial technology, such as car radar, GPU, LCP, etc.; by using mostly commercial off the shelf parts, cost and risk can be reduced; the derived computational algorithms are highly parallel; modular design can tolerate the loss of multiple receivers with no significant degradation; and the sensor is lightweight, and its components can be integrated conformally with the aircraft skin.

What is claimed is:

1. A method of detecting an object, comprising:
providing a first electromagnetic wave transmitter mounted on a rotor blade of a rotor of a helicopter;
providing a first electromagnetic wave receiver mounted on a body of the helicopter;
transmitting electromagnetic radiation from the first electromagnetic wave transmitter;
receiving a first beat signal at the first electromagnetic wave receiver, the first beat signal formed from electromagnetic radiation transmitted by the first electromagnetic wave transmitter that directly reaches the first electromagnetic wave receiver and electromagnetic radiation transmitted by the first electromagnetic wave transmitter that reaches the first electromagnetic wave receiver after being reflected off of the object; and
processing the first beat signal to detect the object.

2. The method of claim 1,
wherein processing the first beat signal to detect the object includes forming a three-dimensional image that includes the object.

3. The method of claim 1,
wherein the electromagnetic radiation transmitted from the first electromagnetic wave transmitter has a millimeter wave (mmW) radio frequency.

4. The method of claim 1,
wherein the electromagnetic radiation generated from the first electromagnetic wave transmitter includes different electromagnetic wave frequencies.

5. The method of claim 4,
wherein the first electromagnetic wave transmitter generates a first electromagnetic frequency at a fixed frequency with respect to its location on the rotor for a first time period equal to at least plural rotations of the rotor,
wherein the first electromagnetic frequency is transmitted from the first electromagnetic wave transmitter with a varying frequency during the first time period with respect to a location on the body of the helicopter.

6. The method of claim 1, further comprising:
mounting at least a second electromagnetic wave receiver on the body of the helicopter,
wherein at least one of the first electromagnetic wave receiver and the second electromagnetic wave receiver is not located at a central axis of rotation of the rotor; and
receiving a second beat signal at the second electromagnetic wave receiver, the second beat signal formed from an electromagnetic wave transmitted by the first electromagnetic wave transmitter that directly reaches the first electromagnetic wave receiver and an electromagnetic wave transmitted by the first electromagnetic wave transmitter that reaches the second electromagnetic wave receiver after being reflected off of the object.

7. The method of claim 6, further comprising:
processing the first beat signal and the second beat signal to detect the object.

8. A method of determining information about an object outside of a vehicle, the method comprising:
providing a first electromagnetic wave transmitter on the vehicle;
providing a first electromagnetic wave receiver on the vehicle;
transmitting electromagnetic radiation from the first electromagnetic wave transmitter;
receiving a first signal at the first electromagnetic wave receiver, the first signal formed from an electromagnetic wave transmitted by the first electromagnetic wave transmitter that directly reaches the first electromagnetic wave receiver and an electromagnetic wave transmitted by the first electromagnetic wave transmitter that reaches the first electromagnetic wave receiver after being reflected off of the object; and
processing the first signal to determine information about the object.

9. The method of claim 8,
wherein processing the first signal to determine information about the object includes determining a location of the object.

10. The method of claim 9,
wherein processing the first signal to determine information about the object results in reconstructing a three-dimensional image that includes the object.

11. The method of claim 8,
wherein the vehicle includes at least a first rotating part, and one of the first electromagnetic wave transmitter and the first electromagnetic wave receiver is placed on the first rotating part, and the other of the first electromagnetic wave transmitter and the first electromagnetic wave receiver is placed on a non-rotating location on the vehicle.

12. The method of claim 11,
wherein the first rotating part is a rotating blade, and
wherein the first electromagnetic wave transmitter is placed on the rotating blade.

13. The method of claim 12,
wherein the vehicle is a helicopter including a body and a rotor that includes the rotating blade, and
the first electromagnetic wave receiver is placed on an outside surface of the body of the helicopter.

14. The method of claim 8,
wherein the electromagnetic radiation has a millimeter wave (mmW) frequency.

15. A method of determining information about an object outside of a vehicle, the method comprising:
providing a first electromagnetic wave transmitter on the vehicle, the first electromagnetic wave transmitter generating a first electromagnetic wave;
providing a first electromagnetic wave receiver on the vehicle,
transmitting electromagnetic radiation from the first electromagnetic wave transmitter directly to the first electromagnetic wave receiver, thereby transmitting a direct electromagnetic wave;
transmitting electromagnetic radiation from the first electromagnetic wave transmitter to the first electromagnetic wave receiver through an object which reflects the electromagnetic radiation, thereby transmitting a reflected electromagnetic wave that is affected by a Doppler shift as compared to the direct electromagnetic wave;
receiving an interference signal by the first electromagnetic wave receiver, the interference signal formed from the direct electromagnetic wave and the reflected electromagnetic wave, and sampling the interference signal to form a beat signal; and
processing the beat signal to determine information about the object.

16. The method of claim 15,
wherein the first electromagnetic wave transmitter is located on a rotating part of the vehicle, and the rotation of the rotating part causes the reflected electromagnetic wave to be altered due to a Doppler shift.

17. The method of claim 16,
wherein the vehicle is a helicopter and the rotating part is a blade of a main rotor of the helicopter.

18. The method of claim 17,
wherein the direct electromagnetic wave and the reflected electromagnetic wave are millimeter wave (mmW) frequency electromagnetic waves.

19. A method of determining information about an object outside of a vehicle, the method comprising:
providing a first electromagnetic wave transmitter on the vehicle, the first electromagnetic wave transmitter generating a first electromagnetic wave;
providing a first electromagnetic wave receiver on the vehicle,
transmitting electromagnetic radiation from the first electromagnetic wave transmitter directly to the first electromagnetic wave receiver, thereby transmitting a direct electromagnetic wave;
transmitting electromagnetic radiation from the first electromagnetic wave transmitter to the first electromagnetic wave receiver through an object which reflects the electromagnetic radiation, thereby transmitting a reflected electromagnetic wave that is affected by a Doppler shift as compared to the direct electromagnetic wave;
determining a beat signal based on the direct electromagnetic wave and the reflected electromagnetic wave; and
recording the beat signal.

20. The method of claim 19, further comprising:
processing the beat signal to reconstruct a scene.

21. The method of claim 20,
wherein the vehicle is a helicopter and the first electromagnetic wave transmitter is located on a blade of a main rotor of the helicopter; and
wherein the reconstructed scene includes a scene below the helicopter.

22. A method of determining information about an object outside of a vehicle, the method comprising:
providing a plurality of electromagnetic wave transmitters on the vehicle operating at different frequencies;
providing a plurality of electromagnetic wave receivers on the vehicle, the receivers tuned to receive the frequencies, at which the transmitters operate;
transmitting electromagnetic radiation from the electromagnetic wave transmitters at frequencies at which the transmitters operate;
sampling with the receivers the interference patterns formed from electromagnetic waves transmitted by the transmitters directly and electromagnetic waves transmitted by the transmitters and reflected from an object outside the vehicle; and processing the sampled interference patterns to determine information about the object.

23. The method of claim 22, wherein the plurality of electromagnetic wave receivers include a plurality of sets of electromagnetic wave receivers, each set including one or more electromagnetic wave receivers tuned to a particular frequency; and each transmitter of the plurality of electromagnetic wave transmitters operates at a respective frequency corresponding to the tuning frequency of one of the sets of electromagnetic wave receivers.

24. The method of claim 23, wherein processing the sampled interference patterns includes reconstructing a three-dimensional scene outside the vehicle.

25. The method of claim 22, wherein the vehicle is a helicopter and the plurality of electromagnetic wave transmitters are located on one or more a blades of a main rotor of the helicopter.

* * * * *